(12) United States Patent
Mihal et al.

(10) Patent No.: US 11,373,325 B1
(45) Date of Patent: Jun. 28, 2022

(54) MACHINE-TRAINED NETWORK FOR MISALIGNMENT-INSENSITIVE DEPTH PERCEPTION

(71) Applicant: Perceive Corporation, San Jose, CA (US)

(72) Inventors: Andrew Mihal, San Jose, CA (US); Steven Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 56 days.

(21) Appl. No.: 16/591,591

(22) Filed: Oct. 2, 2019

Related U.S. Application Data

(63) Continuation of application No. 15/869,990, filed on Jan. 12, 2018, now Pat. No. 10,453,220.

(60) Provisional application No. 62/611,923, filed on Dec. 29, 2017.

(51) Int. Cl.
| | |
|---|---|
| *G06T 7/593* | (2017.01) |
| *G06T 7/80* | (2017.01) |
| *G06T 7/55* | (2017.01) |
| *G06T 7/521* | (2017.01) |
| *H04N 13/246* | (2018.01) |

(52) U.S. Cl.
CPC ............. *G06T 7/593* (2017.01); *G06T 7/521* (2017.01); *G06T 7/55* (2017.01); *G06T 7/85* (2017.01); *G06T 2207/20081* (2013.01); *H04N 13/246* (2018.05)

(58) Field of Classification Search
CPC ........... G06T 7/593; G06T 7/85; G06T 7/521; G06T 7/55; G06T 7/50–596; G06T 2207/10012; G06T 2207/10021; G06T 2207/20081; G06T 2207/20084; G06N 3/02–088; H04N 13/204; H04N 13/239; H04N 13/243; H04N 13/246
USPC .......................................... 382/154, 156–158
See application file for complete search history.

(56) References Cited

U.S. PATENT DOCUMENTS

| | | |
|---|---|---|
| 5,960,108 A | 9/1999 | Xiong |
| 9,053,562 B1 | 6/2015 | Rabin et al. |
| 9,383,548 B2 | 7/2016 | Lansel |

(Continued)

OTHER PUBLICATIONS

Rojas, Raul. "The backpropagation algorithm." Neural networks. Springer, Berlin, Heidelberg, 1996. 149-182. (Year: 1996).*

(Continued)

*Primary Examiner* — Shefali D Goradia
(74) *Attorney, Agent, or Firm* — Adeli LLP

(57) ABSTRACT

Some embodiments of the invention provide a novel method for training a multi-layer node network to reliably determine depth based on a plurality of input sources (e.g., cameras, microphones, etc.) that may be arranged with deviations from an ideal alignment or placement. Some embodiments train the multi-layer network using a set of inputs generated with random misalignments incorporated into the training set. In some embodiments, the training set includes (i) a synthetically generated training set based on a three-dimensional ground truth model as it would be sensed by a sensor array from different positions and with different deviations from ideal alignment and placement, and/or (ii) a training set generated by a set of actual sensor arrays augmented with an additional sensor (e.g., additional camera or time of flight measurement device such as lidar) to collect ground truth data.

20 Claims, 14 Drawing Sheets

(56) References Cited

U.S. PATENT DOCUMENTS

| | | | |
|---|---|---|---|
| 9,792,501 | B1 | 10/2017 | Maheriya et al. |
| 9,842,254 | B1 | 12/2017 | Brailovskiy et al. |
| 10,019,654 | B1 | 7/2018 | Pisoni |
| 10,147,023 | B1 | 12/2018 | Klaudiny et al. |
| 10,453,220 | B1* | 10/2019 | Mihai ............... G06T 7/593 |
| 10,572,979 | B2 | 2/2020 | Vogels et al. |
| 10,742,959 | B1 | 8/2020 | Mihal et al. |
| 11,043,006 | B1 | 6/2021 | Mihal et al. |
| 2004/0169724 | A1 | 9/2004 | Ekpar |
| 2008/0062262 | A1 | 3/2008 | Perron et al. |
| 2012/0056800 | A1 | 3/2012 | Williams et al. |
| 2014/0132786 | A1 | 5/2014 | Saitwal et al. |
| 2014/0320608 | A1* | 10/2014 | Muukki ............. G06F 13/4282 348/47 |
| 2014/0327754 | A1 | 11/2014 | Prabhakar |
| 2015/0358539 | A1 | 12/2015 | Catt |
| 2015/0363758 | A1 | 12/2015 | Wu et al. |
| 2016/0125588 | A1 | 5/2016 | Choi et al. |
| 2016/0127641 | A1 | 5/2016 | Gove |
| 2016/0191891 | A1 | 6/2016 | Gilpin |
| 2016/0248985 | A1 | 8/2016 | Mate et al. |
| 2016/0260222 | A1 | 9/2016 | Paglieroni et al. |
| 2016/0278558 | A1 | 9/2016 | Ansari |
| 2016/0379352 | A1 | 12/2016 | Zhang et al. |
| 2017/0011281 | A1 | 1/2017 | Dijkman et al. |
| 2017/0018086 | A1 | 1/2017 | Zhang |
| 2017/0041557 | A1 | 2/2017 | Urich et al. |
| 2017/0068844 | A1 | 3/2017 | Friedland |
| 2017/0195654 | A1 | 7/2017 | Powers et al. |
| 2017/0201727 | A1 | 7/2017 | Mendlovic et al. |
| 2017/0249751 | A1 | 8/2017 | Indelman |
| 2017/0278289 | A1 | 9/2017 | Marino et al. |
| 2017/0334066 | A1 | 11/2017 | Levine et al. |
| 2017/0357896 | A1 | 12/2017 | Tsatsin et al. |
| 2017/0363949 | A1 | 12/2017 | Valente et al. |
| 2018/0005034 | A1 | 1/2018 | Kaehler et al. |
| 2018/0025268 | A1 | 1/2018 | Teig et al. |
| 2018/0033162 | A1 | 2/2018 | Chang et al. |
| 2018/0059679 | A1* | 3/2018 | Taimouri ............... G06T 7/50 |
| 2018/0075347 | A1 | 3/2018 | Alistarh et al. |
| 2018/0077400 | A1 | 3/2018 | Ayari et al. |
| 2018/0107999 | A1 | 4/2018 | Rizzolo et al. |
| 2018/0108120 | A1 | 4/2018 | Venable et al. |
| 2018/0121762 | A1 | 5/2018 | Han et al. |
| 2018/0150715 | A1 | 5/2018 | Chang et al. |
| 2018/0176446 | A1 | 6/2018 | Reynolds et al. |
| 2018/0177461 | A1 | 6/2018 | Bell et al. |
| 2018/0182071 | A1 | 6/2018 | Ayari et al. |
| 2018/0189567 | A1 | 7/2018 | Maheriya et al. |
| 2018/0227479 | A1 | 8/2018 | Parameswaran et al. |
| 2018/0253865 | A1 | 9/2018 | Price et al. |
| 2018/0293496 | A1 | 10/2018 | Vogels et al. |
| 2018/0293713 | A1 | 10/2018 | Vogels et al. |
| 2018/0341248 | A1* | 11/2018 | Mehr .................. G06N 3/08 |
| 2018/0349477 | A1 | 12/2018 | Jaech et al. |
| 2019/0005358 | A1 | 1/2019 | Pisoni |
| 2019/0005670 | A1 | 1/2019 | DeTone et al. |
| 2019/0108651 | A1 | 4/2019 | Gu et al. |
| 2019/0114804 | A1 | 4/2019 | Sundaresan et al. |
| 2019/0122378 | A1 | 4/2019 | Aswin |
| 2020/0077023 | A1* | 3/2020 | Kang ................. H04N 5/23258 |

OTHER PUBLICATIONS

Mayer, Nikolaus, et al. "A Large Dataset to Train Convolutional Networks for Disparity, Optical Flow, and Scene Flow Estimation." 2016 IEEE Conference on Computer Vision and Pattern Recognition (CVPR). IEEE, 2016. (Year: 2016).*

Mishra, Divyanshu. "Convolution Vs Correlation." Towards Data Science, Nov. 13, 2019, https://towardsdatascience.com/convolution-vs-correlation-af868b6b4fb5. Accessed Mar. 8, 2021. (Year: 2019).*

DiVerdi, Stephen, and Jonathan T. Barron. "Geometric calibration for mobile, stereo, autofocus cameras." 2016 IEEE Winter Conference on Applications of Computer Vision (WACV). IEEE, 2016. (Year: 2016).*

Lin, Kai Wun, et al. "A wearable stereo vision system for visually impaired." 2012 IEEE International Conference on Mechatronics and Automation. IEEE, 2012. (Year: 2012).*

Memony, Qurban, and Sohaib Khanz. "Camera calibration and three-dimensional world reconstruction of stereo-vision using neural networks." International Journal of Systems Science 32.9 (2001): 1155-1159. (Year: 2001).*

Yadati, Pramod, and Anoop M. Namboodiri. "Multiscale two-view stereo using convolutional neural networks for unrectified images." 2017 Fifteenth IAPR International Conference on Machine Vision Applications (MVA). IEEE, 2017. (Year: 2017).*

Bruns, Erich, et al., "Mobile Phone-Enabled Museum Guidance with Adaptive Classification," IEEE Computer Graphics and Applications, Jul. 9, 2008, 5 pages, vol. 28, Issue 4, IEEE.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Jain, Anil K., et al., "Artificial Neural Networks: A Tutorial," Computer, Mar. 1996, 14 pages, vol. 29, Issue 3, IEEE.

Non-published commonly owned U.S. Appl. No. 15/869,990, filed Jan. 12, 2018, 49 pages, Perceive Corporation.

Non-published commonly owned U.S. Appl. No. 15/870,020, filed Jan. 12, 2018, 49 pages, Perceive Corporation.

Non-published commonly owned U.S. Appl. No. 15/870,046, filed Jan. 12, 2018, 49 pages, Perceive Corporation.

Non-published commonly owned U.S. Appl. No. 15/870,070, filed Jan. 12, 2018, 49 pages, Perceive Corporation.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Author Unknown, "Renderman Support: Multi-Camera Rendering," Feb. 2007, 8 pages, Pixar Animation Studios.

Author Unknown, "Renderman Support: REYES Options," Month Unknown 2015, 42 pages, Pixar Animation Studios.

Mitchell, Tom, "Artificial Neural Networks," Machine Learning—Chapter 4, Month Unknown 1997, 47 pages, McGraw Hill.

* cited by examiner

MACHINE-TRAINED NETWORK FOR MISALIGNMENT-INSENSITIVE DEPTH PERCEPTION

CLAIM OF BENEFIT TO PRIOR APPLICATIONS

This application is a continuation application of U.S. patent application Ser. No. 15/869,990, filed Jan. 12, 2018, now issued as U.S. Pat. No. 10,453,220. U.S. patent application Ser. No. 15/869,990 claims the benefit of U.S. Provisional Patent Application 62/611,923, filed Dec. 29, 2017. U.S. patent application Ser. No. 15/869,990, now issued as U.S. Pat. No. 10,453,220, is incorporated herein by reference.

BACKGROUND

Existing approaches to stereo depth perception are dependent on tight manufacturing tolerances in the assembly of the sensor arrays. If the distance between the sensors is not tightly controlled, or, in the case of cameras, if the optical axes of the cameras are not parallel, then existing approaches will compute inaccurate depth measurements and there will be significant variation in accuracy from one assembly to the next. Achieving reliably accurate depth adds significant manufacturing and calibration expense.

A method that reliably produces accurate depth measurements despite common sensor array misalignments is thus necessary.

BRIEF SUMMARY

Some embodiments of the invention provide a novel method for training a multi-layer node network to reliably determine depth based on a plurality of input sources (e.g., cameras, microphones, etc.) that may be arranged with deviations from an ideal alignment or placement. The multi-layer network of some embodiments includes a layer of one or more input nodes, a layer of one or more output nodes, and one or more layers of hidden (interior) nodes. Each node in the multi-layer network produces an output value based on one or more input values. Specifically, each hidden node and output node, in some embodiments, bases the output value on the output values of a set of other nodes (e.g., the set of nodes of the previous layer). Some embodiments include convolutional, pooling, and de-convolutional layers of nodes. In some embodiments, each node includes (i) a linear component that uses a set of weight values to linearly combine the input values to the node to produce an intermediate result and (ii) a non-linear component that applies a non-linear function to the intermediate result to calculate the output value for the node.

During training of the network, the weight values are adjusted to arrive at a trained network that produces optimal outputs for any input value. The multi-layer network may be designed to perform a specific function when embedded in a device (e.g., a mobile device such as a smart phone, a vehicle sensor array, a virtual assistant device such as those offered by Amazon® and Google®, an Internet of Things (TOT) device such as a smart refrigerator, baby monitor, etc., or other devices). Such functions can include depth perception, misalignment calibration, etc.

Some embodiments train the multi-layer network using a set of inputs generated with random misalignments incorporated into the training set. In some embodiments, the training set includes (i) a synthetically generated training set based on a three-dimensional ground truth model as it would be sensed by a sensor array from different positions and with different deviations from ideal alignment and placement, and/or (ii) a training set generated by a set of actual sensor arrays augmented with an additional sensor (e.g., additional camera or time of flight measurement device such as lidar) to collect ground truth data.

To train the multi-layer network, some embodiments first propagate a set of inputs through the network, with each input generating a set of outputs. Some embodiments perform training with a large number of different inputs, as this can help train the weight values for an average input. Each input (e.g., a set of images, a set of audio data, etc.) propagates through the network, with each layer of nodes receiving their one or more inputs and generating an output to pass to subsequent layers of nodes. In the final output layer, one or more nodes receives the outputs from the previous layers and generates the outputs. A loss function measures the difference between the output for a particular input and a predefined expected, or optimal, output for that input.

In typical training, the gradient of the loss function is back propagated through the network in a process that determines, for each weight, the rate of change of the loss function with respect to a change of the weight at the current value of the loss function. The back propagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network. These gradients are used to update the weight values by moving the weight values in the direction opposite the gradient (to attempt to reduce the loss function value) by a particular amount, with a larger gradient for a particular weight resulting in a greater change to that weight.

For convolutional layers, a set of kernels is applied to a set of inputs to generate a set of output node clusters. Each node in an output node cluster has a finite number of inputs that is based on the kernel size (e.g., 3×3 or 5×5×3) and each kernel has a fixed number of weights associated with it (e.g., 9 for a 3×3 kernel, or 75 for a 5×5×3 kernel) such that, for each output node cluster, only the weights of the kernel are configurable parameters. This is in contrast to a fully connected layer in which each node has a configurable parameter to account for the weight of each node in a previous node layer. In some embodiments, multiple kernels are applied to a set of input data to generate multiple output clusters (sometimes referred to as channels) and the weights for the different kernels are trained independently in a convolutional layer. In some embodiments, a kernel is applied to a set of nodes to reduce the number of output nodes (e.g., by using a stride greater than 1 when applying the kernel). As an additional function of a convolutional layer, pooling is used in some embodiments to reduce the size of the output node clusters. In some embodiments, pooling layers are separate from the convolutional layers. Pooling in some embodiments uses one of a maximum or an average of a number of data values (e.g., pixel values in an area of an image) to represent the multiple data values as a single value thus reducing the number of nodes (data values) by a factor proportional to the number of data values used in the pooling calculation.

After the input data has been put through a number of convolutional layers comprising a contracting part of the convolutional network, the data is then put through a series of layers in an expanding part of the convolutional network that is used to increase the resolution (i.e. the number of nodes/pixels) of the reduced-resolution hidden layers and compute the associated output. In some embodiments, the series of layers in the expanding part of the convolutional network include various convolutional layers, such as upconvolutional (sometimes referred to as upsampling, deconvolutional, or transpose convolutional) layers that increase the number of nodes (data values) in an output node cluster (i.e., channel) as well as standard convolutional layers that maintain the number of nodes in an output node cluster (i.e., channel). In some embodiments, the output of the earlier convolutional layers in the contracting part is used as inputs for layers in the expanding part of the convolutional network.

After training the multi-layer network, the network is loaded in a device, in some embodiments, to provide one of, for example, (i) disparity, (ii) depth, or (iii) misalignment values for images captured by the device. The values provided by the trained multi-layer network are then used, in some embodiments, to perform image processing or interpretation. For example, depth values (or depth calculated from a set of disparity values) is used in some devices to create a bokeh effect that mimics the effect of a wide-aperture lens and keeps a subject of an image in focus while blurring the non-subject pixels (i.e., those pixels at a different depth then the subject).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 7A-C illustrate examples of convolutional layers and a pooling layer that may be used in the convolutional network of FIG. 6.

DETAILED DESCRIPTION

Some embodiments of the invention provide a novel method for training a multi-layer node network (e.g., a machine-trained (MT) network) to reliably determine depth based on a plurality of input sources (e.g., cameras, microphones, etc.) that may be arranged with deviations from an ideal alignment or placement. The multi-layer network of some embodiments includes a layer of one or more input nodes, a layer of one or more output nodes, and one or more layers of hidden (interior) nodes. Each node in the multi-layer network produces an output value based on one or more input values. Specifically, each hidden node and output node, in some embodiments, bases the output value on the output values of a set of other nodes (e.g., the set of nodes of the previous layer). Some embodiments include convolutional, pooling, and de-convolutional layers of nodes. In some embodiments, each node includes (i) a linear component that uses a set of weight values to linearly combine the input values of the node to produce an intermediate result and (ii) a non-linear component that applies a non-linear function to the intermediate result to calculate the output value for the node.

Figure 1:
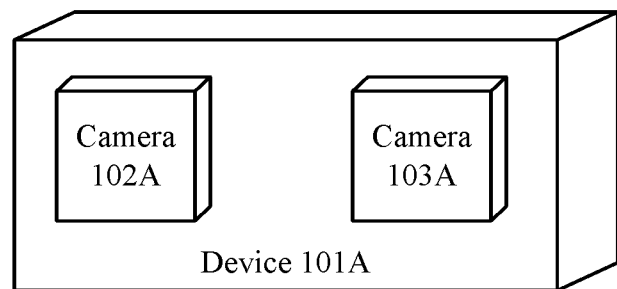
FIG. 1 conceptually illustrates a sensor array in perfect alignment and with misalignment.
Figure 1:
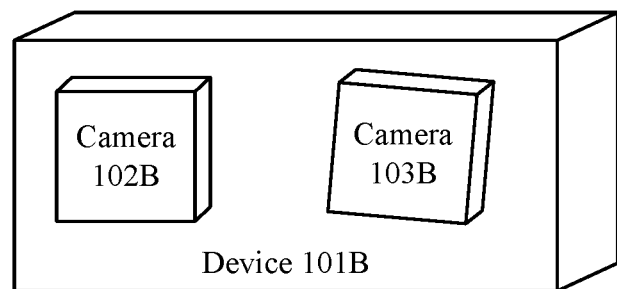
Figure 1:
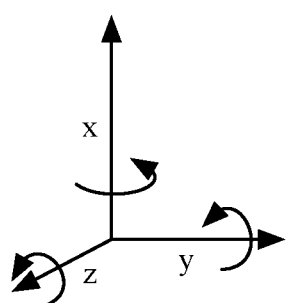

FIG. 1 depicts a simple two camera array as an example of a sensor array that may be subject to misalignment. Device 101A is depicted as having a sensor array including 2 cameras, camera 102A and camera 103A in perfect alignment. In this case perfect alignment means that the cameras are oriented with collinear surface normal vectors, a fixed displacement along one axis (e.g., the y axis), no displacement along either of the other two axes and no rotation about any of the three axes. Device 101B is depicted as having a sensor array including 2 cameras, camera 102B and camera 103B in misalignment. Misalignments in some embodiments include a displacement along any or all of the axes and a relative rotation of the camera around any or all of the axes. In some embodiments, misalignments are the result of a combination of any of manufacturing defects, ambient conditions (e.g., temperature, humidity, etc.), and sensor array orientation (e.g., a phone being held horizontally or vertically). Misalignments, in some embodiments, change over time, for example after a sensor array is dropped or jostled, or with changing ambient conditions or sensor array orientation.

In some embodiments, a sensor array includes more than two sensors and may include sensors with different characteristics (e.g., a camera array with a grid of 16 cameras, or a camera array with multiple cameras including both rectilinear and fisheye lenses.) Camera arrays, in some embodiments, use cameras that are not oriented in the same direction as in FIG. 1, but are designed to capture a scene from different positions and pointing in different directions (e.g., a camera array for capturing a 360° view of a scene).

Figure 2:
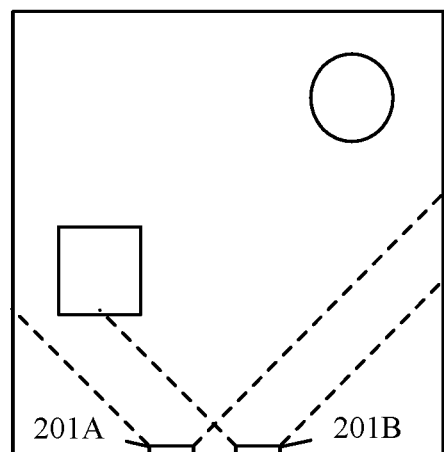
FIG. 2 conceptually illustrates a simple field of objects and images captured by perfectly aligned and misaligned camera pairs.
Figure 2:
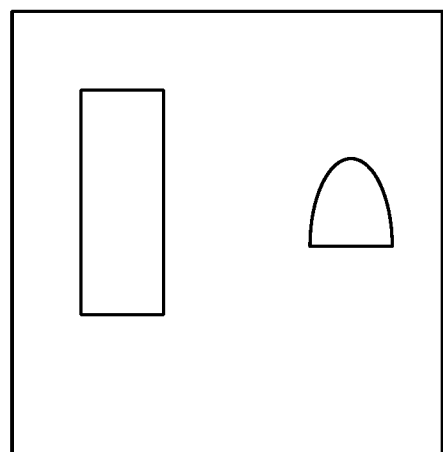
Figure 2:
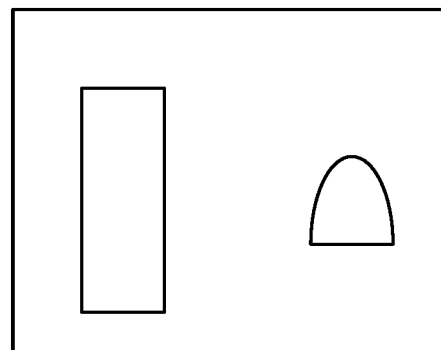
Figure 2:
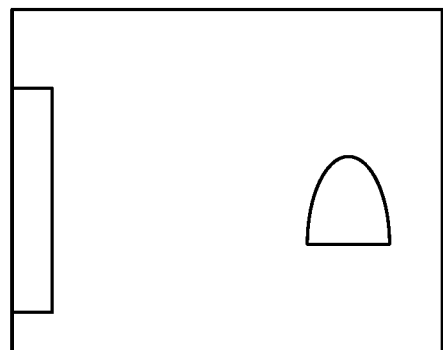
Figure 2:
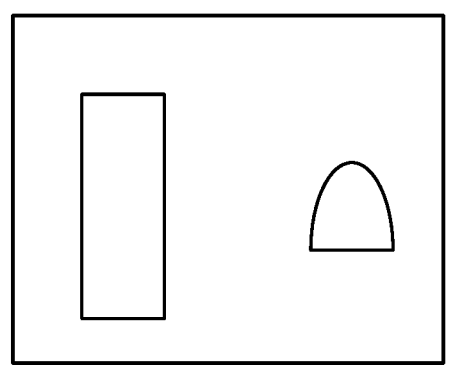
Figure 2:
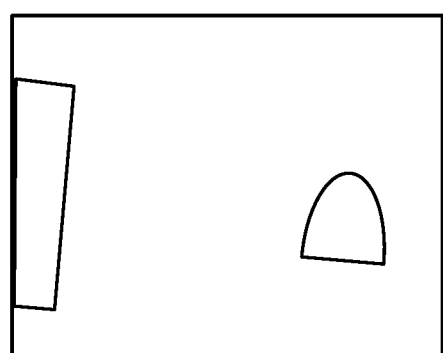

FIG. 2 depicts a simple field of objects 200 and 210, a pair of cameras 201A and 201B, sets of images that are captured from a perfectly aligned set of cameras (i.e., images 220A and 220B), and the corresponding set of images from a misaligned set of cameras (i.e., images 230A and 230B). For perfectly aligned cameras, features are displaced by a certain number of pixels along the axis of displacement of the cameras. But, for a misaligned camera array, features are displaced by a certain number of pixels along a line that has components along multiple axes. The displacement of objects is used to calculate a depth value for each pixel in at least one of the images in the pair of images. In some embodiments, a disparity value (e.g., the number of pixels that an object has shifted between images) is calculated and a simple mathematical formula is used to relate the disparity to the depth of the object based on a constant and the disparity (depth=constant/disparity). The constant, in some embodiments, is the product of the focal length of the cameras and a baseline distance between the cameras (e.g., depth=focal length*baseline/disparity).

Some embodiments train the multi-layer network using a set of inputs generated with random misalignments incorporated into the training set. In some embodiments, the training set includes (i) a synthetically generated training set based on a three-dimensional ground truth model as it would be sensed by a sensor array from different positions and with different deviations from ideal alignment and placement, and/or (ii) a training set generated by a set of actual sensor arrays augmented with at least one additional sensor (e.g., additional camera or time of flight measurement device such as lidar) to collect ground truth data. As used in this document, ground truth data refers to the data that is used in calculating the loss function. As described below, ground truth data may be generated synthetically or by additional sensors that capture data to compare to the output of a network or output derived from the output of a network (e.g., in the case of ground truth image data).

Figure 3:
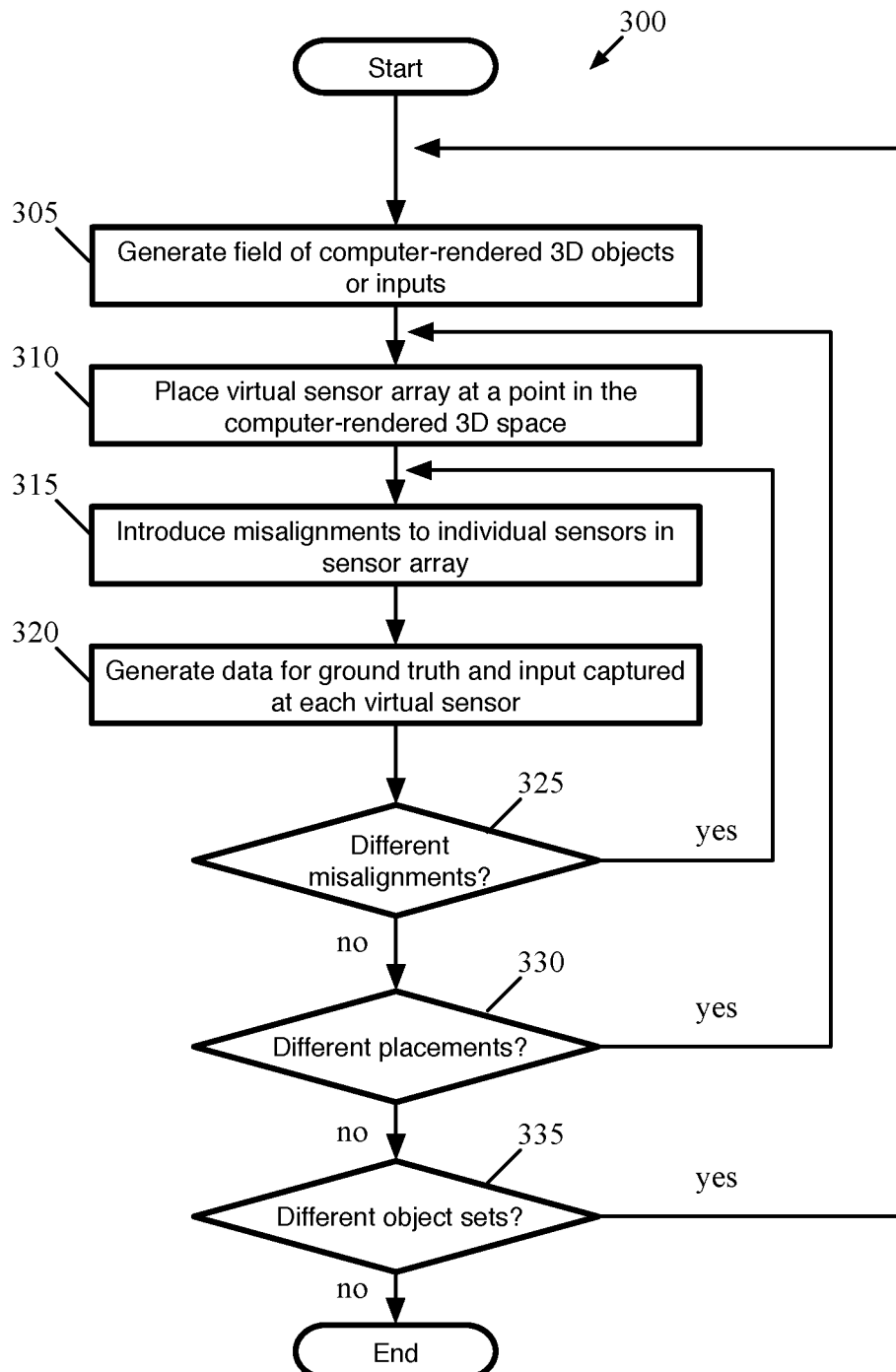
FIG. 3 conceptually illustrates a process for generating a synthetic data set for training a multi-layer machine-trained network.
Figure 4:
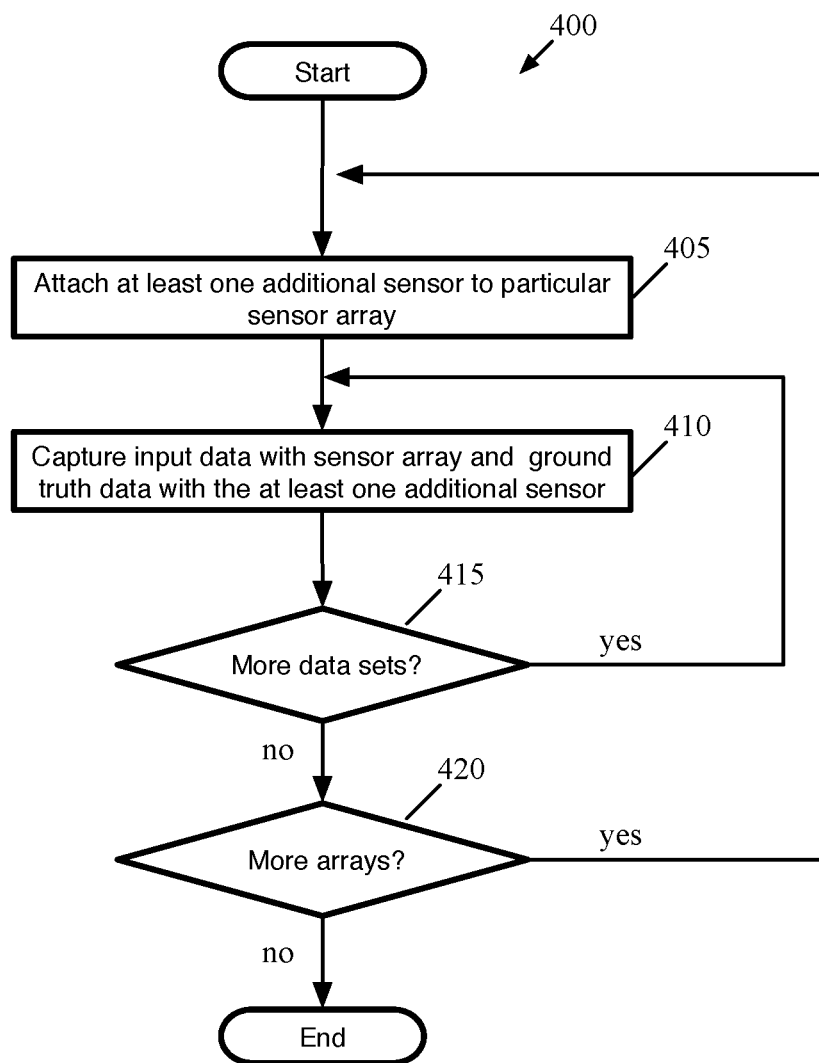
FIG. 4 conceptually illustrates a process for generating a data set for training a multi-layer machine-trained network.

FIGS. 3 and 4 conceptually describe a process for generating different training sets including different misalignments used to train a multi-layer network to calculate disparity/depth with less sensitivity to misalignment. As shown, process 300 starts (at 305) by generating a field of computer rendered objects or inputs. For example, a three-dimensional drafting program may be used to define a set of objects at different positions and orientations in a three-dimensional space. The objects, in some embodiments, are colored or patterned differently and have different textures applied. Other embodiments may generate a set of inputs such as a set of audio signals with sources at different positions and with different qualities such as pitch, amplitude, timbre, etc. In either case, the number and nature of objects/inputs may be fixed, selected from a set of acceptable options, or randomly generated. The set of generated objects or inputs form the basis of a synthetic training set that is used to train the multi-layer network in some embodiments.

The benefits of synthetic training sets include the ability to generate large and diverse data sets with dense ground truth information. Large and diverse datasets serve to avoid at least the problem of overfitting and other benefits will be known to one of ordinary skill in the art. Dense ground truth data allows at least for more training data to be produced by each image run through the multi-layer network (e.g., being able to compare more output nodes to an expected result generates more data points for gradient calculations).

After generating the field of computer rendered objects or inputs, the process places (at 310) a virtual sensor array (e.g., an array of cameras, microphones, etc.) at a point in the three-dimensional space. The process then introduces misalignments (at 315) to various sensors in the sensor array. In some embodiments, the misalignments include displacement along any of three orthogonal axes as well as rotations about any of the three orthogonal axes. In some embodiments, the magnitude of the misalignment is guided by manufacturing tolerances of the physical sensor arrays for which the training sets are being produced. For example, if the manufacturing process places sensors with an error of less than 0.1 mm in any direction, and rotation of less than 5 degrees around any axis, misalignments of the virtual camera will be within the same bounds, or otherwise based on the manufacturing tolerances (e.g., within one standard deviation), so as to train the multi-layer network using representative data.

The process then generates (at 320) data representing the input to the sensor array based on the set of objects, sensor array placement, and individual sensor misalignment. The process also generates (at 320) a set of data representing the 'ground truth' of the synthetic data set. For training camera sensor arrays, in some embodiments, the ground truth includes the distance to objects as well as a surface normal to any flat surfaces. In some embodiments, the ground truth is generated by a ray tracing operation to determine the depth of an object from an image capture device. For audio data sets, the ground truth includes, in some embodiments, the location of the input source as well as relevant acoustic features (e.g., pitch, amplitude, timbre, etc.). The sensor input and ground truth together make up a synthetic training set that can be used to train the multi-layer network.

The process determines (at 325) whether alternative misalignments should be introduced for the object/input set and virtual sensor array to generate an additional synthetic data set. If the process determines (at 325) that alternative misalignments should be introduced to generate an additional synthetic data set, the process returns to operation 315. In some embodiments, synthetic data sets are generated for multiple misalignments to improve the insensitivity to misalignments for each object/input set or to generate larger synthetic data sets without generating entirely new object/input parameters and sensor array placements.

If the process determines (at 325) that alternative misalignments should not be introduced, the process proceeds (at 330) to determine whether an additional sensor array placement for the current object/input set should be used to generate an additional synthetic data set. If the process determines (at 330) that an additional sensor array placement for the current object/input set should be used to generate an additional synthetic data set, the process returns to operation 310. In some embodiments, synthetic data sets are generated for multiple sensor array placements to generate larger synthetic data sets without generating entirely new object/input parameters.

If the process determines (at 330) that an additional sensor array placement for the current object/input set should not be used, the process proceeds (at 335) to determine whether an additional object/input set should be generated to generate an additional synthetic data set. If the process determines (at 335) that an object/input set should be generated to generate an additional synthetic data set, the process returns to operation 305. In some embodiments, synthetic data sets are generated for multiple object/input sets to generate larger synthetic data sets to increase the quality of the training while avoiding overfitting.

If the process determines (at 335) that an additional object/input set should not be generated, the process ends. In some embodiments, the above process is used to produce larger and more information-dense data sets than is currently available. Additionally, such synthetic data sets can account for specific sensor array arrangements and misalignment parameters (e.g., manufacturing tolerances) and produce large data sets with little cost and in short time frames. One of ordinary skill in the art will appreciate that the process described above may omit certain determination operations, for example, if only one set of synthetic data is to be generated for each object/input set, operations 325 and 330 can be omitted. The process 300, in some embodiments, is used to generate synthetic training data sets with thousands to hundreds of thousands of unique synthetic data sets. Parts of process 300 (e.g., 305-320), in some embodiments, are used to dynamically generate training sets (e.g., synthetic training sets) as part of a training process as described in relation to FIG. 9. These dynamically generated training sets, in some embodiments, are used to supplement a pre-generated set of training sets if the training has not sufficiently converged using the pre-generated training sets.

FIG. 4 conceptually illustrates a second process 400 for generating different training sets including different misalignments. As shown, process 400 starts (at 405) by attaching at least one additional sensor or system to a sensor array. In some embodiments, the sensor is an additional sensor of the same type as the sensors in the sensor array (e.g., an additional camera in an array of cameras). In some embodiments, the additional sensor is of a different type than the sensors in the sensor array (e.g., a lidar sensor/system that measures distances to objects using pulsed laser light added to a camera array, or any other time of flight sensor such as radar, sonar, etc.).

The process then captures (at 410) an input data set for the training set using the sensor array and the corresponding ground truth (expected output) using the additional sensor. For example, a two-camera array that is augmented by a third centrally located camera and a lidar system collects images using the two cameras, and a first set of ground truth data from the centrally located additional camera and a second set of ground truth data from the lidar system. The image that is the first set of ground truth data can be used to compare an interpolated (expected) image based on the original images and the output of the multi-layer network to the ground truth image captured by the additional camera. The second set of data collected by the lidar system can be compared to depth values calculated based on the output of the multi-layer network, for example, when the output is a disparity value, or directly to the output if it is expressed in distance.

The process then determines (at 415) whether additional input data sets should be captured. If the process determines (at 415) that an additional data set should be captured, the process continues to operation 410 to capture an additional data set. In practice, a large number of data sets is likely to be captured using each augmented array of sensors in order to generate a large training data set without the cost of producing a large number of different augmented array systems. The misalignment of the sensors in a particular sensor array is expected to change with array orientation, temperature, physical movement, etc. such that a single augmented array would be expected to generate data sets for a range of misalignments that reflect common misalignments in the deployed sensor array system.

If the process determines (at 415) that an additional data set should not be captured, the process determines (at 420) if additional augmented arrays should be produced. If the process determines (at 420) that an additional augmented array should be produced the process continues with operation 405 to attach at least one additional sensor to a particular sensor array to capture an additional set of data to train the multi-layer network. Additional augmented sensor arrays, in some embodiments, introduce a new set of misalignments and decrease the likelihood of overfitting a data set based on a single augmented sensor array.

If the process determines (at 420) that additional augmented arrays should not be produced, the process ends. One of ordinary skill in the art would understand that the determinations made in operations 415 and 420 may be omitted without fundamentally changing the data collection process, and are merely described for the purpose of presenting a more complete understanding of the process of generating a complete training data set.

The training set generated by either or both of processes 300 and 400 are used to train the network. During training of the network, the weight values are adjusted to arrive at a trained network that produces optimal outputs for any input value. The multi-layer network may be designed to perform a specific function when embedded in a device (e.g., a mobile device such as a smart phone, a vehicle sensor array, a virtual assistant device such as those offered by Amazon® and Google®, an Internet of Things (JOT) device such as a smart refrigerator, baby monitor, etc., or other devices). Such functions can include depth perception, misalignment calibration, etc.

To train the multi-layer network, some embodiments first propagate a set of inputs through the network, with each input generating a set of outputs. Some embodiments perform training with a large number of different inputs, as this can help train the weight values for an average input. As described above, data sets in some embodiments are specifically generated using either or both of processes 300 and 400. Each input (e.g., a set of images, a set of audio data, etc.) propagates through the network, with each layer of nodes receiving their one or more inputs and generating an output to pass to the next layer of nodes. In the final output layer, one or more nodes receives the outputs from nodes in a previous layer or layers and generates the outputs. The loss function measures the difference between the output for a particular input and a predefined expected, or optimal, output for that input (e.g., a ground truth data set).

In typical training, the gradient of the loss function is back propagated through the network in a process that determines, for each weight, the rate of change of the loss function with respect to a change of the weight at the current value of the loss function. The back propagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network. These gradients are used to update the weight values by moving the weight values in the direction opposite the gradient (to attempt to reduce the loss function value) by a particular amount, with a larger gradient for a particular weight resulting in a greater change to that weight.

For convolutional layers, a set of kernels is applied to a set of inputs to generate a set of output node clusters. Each node in an output node cluster has a finite number of inputs that is based on the kernel size (e.g., 3×3 or 5×5×3) and each kernel has a fixed number of weights associated with it (e.g., 9 for a 3×3 kernel, or 75 for a 5×5×3 kernel) such that, for each output node cluster, only the weights of the kernel are configurable parameters. This is in contrast to a fully connected layer in which each node has a configurable parameter to account for the weight of each node in a previous node layer. These different configurations will be explained in more detail in FIGS. 5 and 6.

Figure 5:
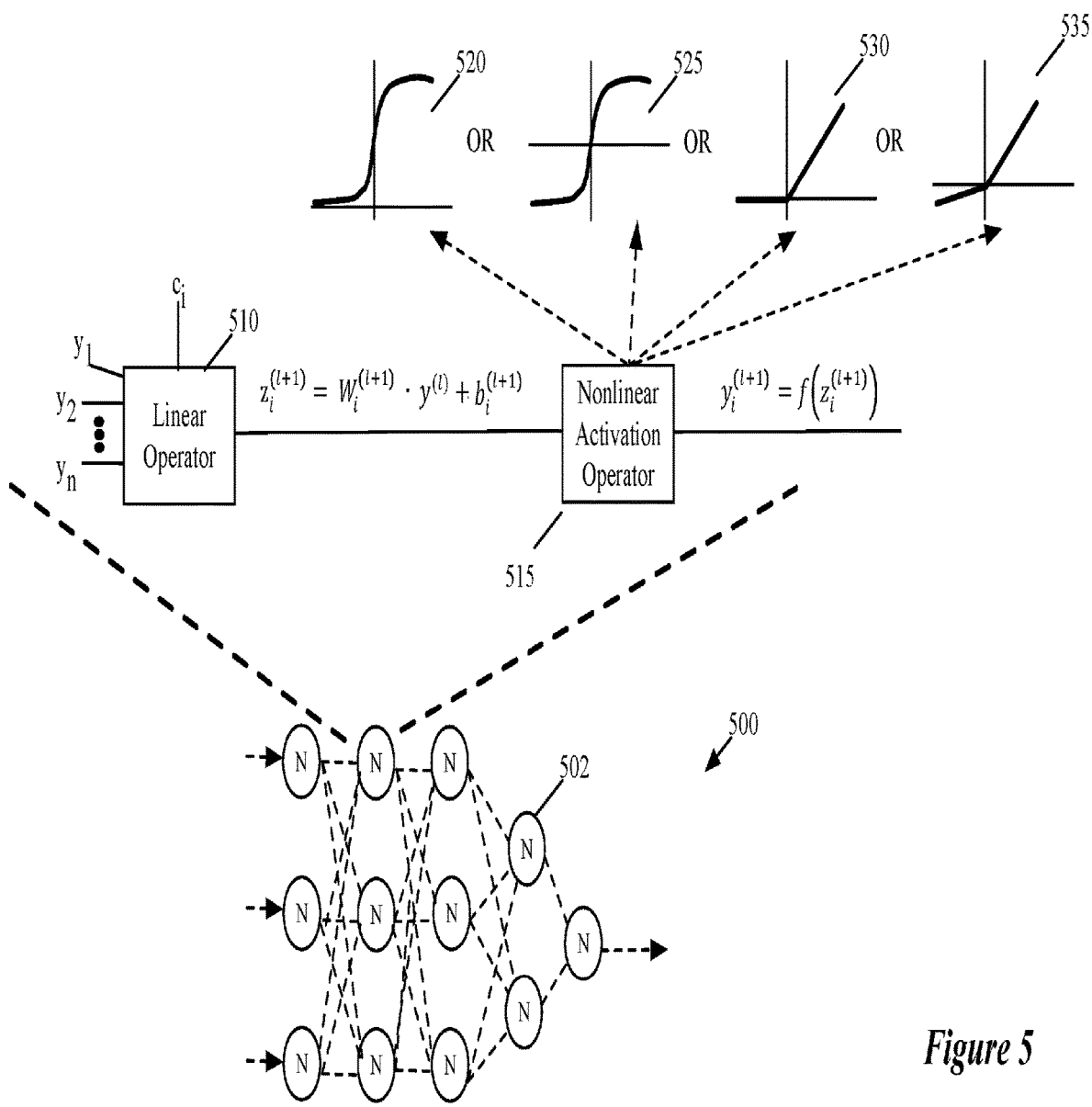
FIG. 5 illustrates a simple feed-forward neural network with two hidden layers having three nodes, and a single output layer with one output node.

FIG. 5 illustrates an example of a multi-layer machine-trained network of some embodiments. This figure illustrates a feedforward neural network 500 that has multiple layers of processing nodes, called neurons 502. In all but the first (input) and last (output) layer, each neuron 502 receives two or more outputs of neurons from earlier processing node layers and provides its output to one or more neurons in subsequent layers. The output of the neuron in the last layer represents the output of the network 500. In some embodiments, the output of the network 500 is a number in a range of values (e.g., 0 to 1). In this example, the neural network 500 only has one output node. Other neural networks of other embodiments have several output nodes that provide more than one output value. In addition, the neural networks of other embodiments may be types of networks other than feed forward networks (e.g., recurrent networks, convolutional networks, etc.).

As shown in FIG. 5, each neuron in neural network 500 has a linear component 510 and a nonlinear component 515. The linear component 510 of each hidden or output neuron in this example computes a dot product of a vector of weight coefficients and a vector of output values of prior nodes, plus an offset. In other words, a hidden or output node's linear operator computes a weighted sum of its inputs (which are outputs of the previous stage neurons that the linear operator receives) plus an offset. Similarly, the linear component 510 of each input neuron of some embodiments computes a dot product of a vector of weight coefficients and a vector of input values, plus an offset. In other embodiments, each input neuron receives a single input and passes that input as its output. Each neuron's nonlinear component 515 computes a function based on the output of the neuron's linear component 510. This function is commonly referred to as the activation function.

The notation of FIG. 5 can be described as follows. Consider a neural network with L−1 hidden layers (i.e., L layers including the input layer and the output layer). The variable l can be any of the hidden layers (i.e., l∈{1, ..., L−1} index the hidden layers of the network, with l=0 representing the input layer and l=L representing the output layer). The variable $z_i^{(l+1)}$ represents the output of the linear component of a hidden neuron i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l plus an offset $b_i$, typically referred to as a bias.

$$z_i^{(l+1)} = W_i^{(l+1)} \cdot y^{(l)} + b_i^{(l+1)} = \sum_{k=1}^{n}\left(w_{ik}^{(l+1)} * y_k^{(l)}\right) + b_i^{(l+1)} \quad (A)$$

The symbol * is an element-wise product, while the symbol · is the dot product. The weight coefficients $W^{(l)}$ are parameters that can be adjusted during the network's training in order to configure this network to solve a particular problem.

The output $y^{(l+1)}$ of the nonlinear component 515 of a neuron in layer l+1 is a function of the neuron's linear component, and can be expressed as by Equation (B) below.

$$y_i^{(l+1)} = f(z_i^{(l+1)}) \quad (B)$$

In this equation, f is the nonlinear activation function for node i. Examples of such activation functions include a sigmoid function 520 ($f(x)=1/(1+e^{-x})$), a tanh function 525, a ReLU (rectified linear unit) function 530 or a leaky ReLU function 535, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C).

$$y_i^{(l+1)} = f(z_i^{(l+1)}) = f\left[\left(\sum_{k=1}^{n} w_{ik} * y_k\right) + b_i^{(l+1)}\right] \quad (C)$$

In this equation, $w_{ik}$ are weight values associated with the inputs $y_k$ of the neuron i in layer l+1.

In some embodiments, multiple kernels are applied to a set of input data to generate multiple output clusters (sometimes referred to as channels) and the weights for the different kernels are trained independently in a convolutional layer. In some embodiments, a kernel is applied to a set of nodes to reduce the number of output nodes (e.g., by using a stride greater than 1 when applying the kernel). As an additional function of a convolutional layer, pooling is used in some embodiments to reduce the size of the output node clusters. In some embodiments, pooling layers are separate from the convolutional layers. Pooling in some embodiments uses one of a maximum or an average of a number of data values (e.g., pixel values in an area of an image) to represent the multiple data values as a single value thus reducing the number of nodes (data values) by a factor proportional to the number of data values used in the pooling calculation.

After the input data has been put through a number of convolutional layers comprising a contracting part of the convolutional network, the data is then put through a series of layers in an expanding part of the convolutional network that is used to increase the resolution (i.e. the number of nodes/pixels) of the reduced-resolution hidden layers and compute the associated output. In some embodiments, the series of layers in the expanding part of the convolutional network include various convolutional layers, such as upconvolutional (sometimes referred to as upsampling, deconvolutional, or transpose convolutional) layers that increase the number of nodes (data values) in an output node cluster (i.e., channel) as well as standard convolutional layers that maintain the number of nodes in an output node cluster (i.e., channel). In some embodiments, the output of the earlier convolutional layers in the contracting part is used as inputs for layers in the expanding part of the convolutional network as will be described in relation to FIG. 6.

Figure 6:
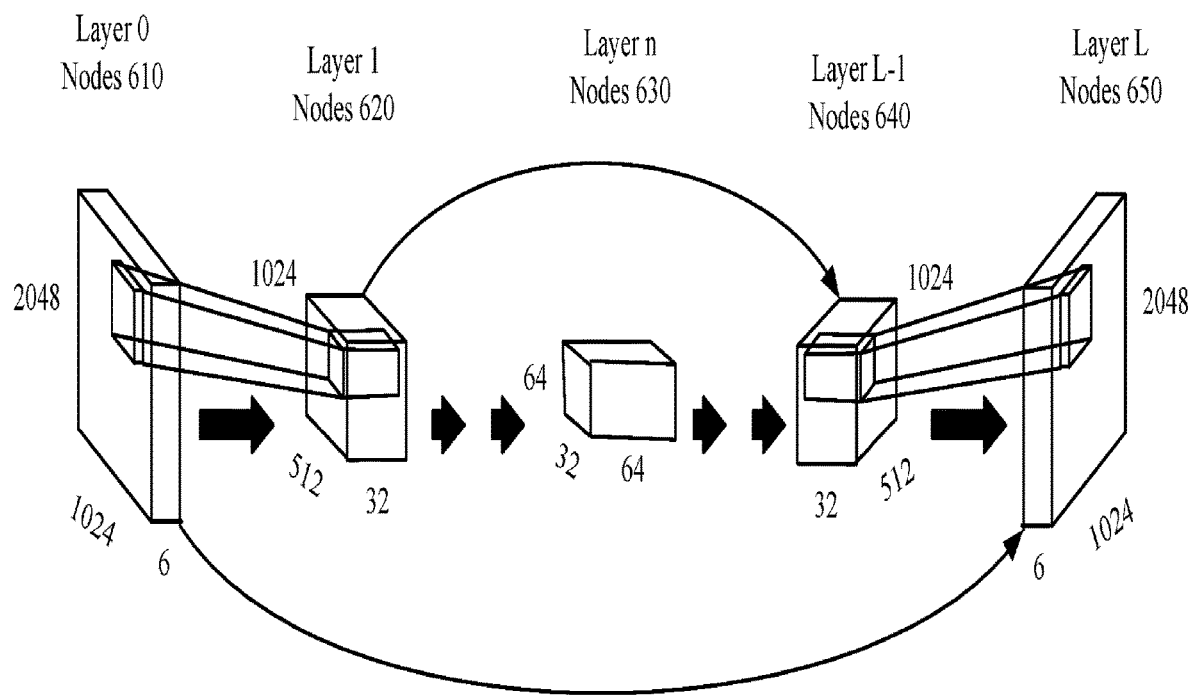
FIG. 6 illustrates a set of convolutional layers in an exemplary convolutional neural network for which some embodiments of the invention are implemented.

FIG. 6 illustrates a set of convolutional layers in an exemplary convolutional neural network (e.g. a specific type of multi-layer machine-trained network) for which some embodiments of the invention are implemented. FIG. 6 is designed for a set of two 1024×2048 images each having three channels (e.g., Red, Green, and Blue channels) as the input at layer 0 made up of nodes 610. Between layer 0 and layer 1 a convolution is applied that reduces the resolution of the output by a factor of 2 in each axis. A convolution, in some embodiments, reduces the resolution by using a stride of 2 (e.g., moving the kernel two pixels before the next application of the kernel). Some embodiments use a convolution that maintains the number of output nodes from the convolution (e.g., uses a stride of 1 and pads the edges of the initial input as necessary) and then uses a separate pooling layer (not shown) to reduce the number of nodes/pixels in the output images (e.g., a pooling operation that takes the maximum or average of a number of nodes/pixels (e.g., a 2×2 or 3×3 square, or a 4×1 strip) to be the output of the pooling layer).

As shown in FIG. 6, the original 6 channels become 32 channels in layer 1. The increased number of channels, in some embodiments, is the result of the application of multiple kernels to the input images. As will be understood by one of ordinary skill in the art, each kernel could be of different size or dimensionality and the weights of the different kernels will be trained independently during training. The application of kernels will be described in further detail in FIGS. 7A-C.

FIG. 6 also includes additional convolutional/pooling layers 2–n that, as a group, further reduce the nodes/pixels of each channel and introduce additional channels. After layer n, the convolutional network performs a number of upconvolutions that increase the number of nodes/pixels and, in some embodiments, reduce the number of channels. Additional convolutions that maintain the number of nodes/pixels for each channel are also applied in some layers. In some embodiments, the output of earlier layers is used as input to later convolutional layers (e.g., the output of nodes 620 of layer 1 are used as input for nodes 640 of layer L−1). Additional layers in the expanding part of the convolutional network may provide intermediate predictions as to the disparity in the images based on the current set of output channels that are used to inform subsequent convolutional or prediction layers.

Table 2 below provides details for a complete convolutional network used in some embodiments to calculate disparity values for a set of two images each having a set of three channels (e.g., one for each of red, green, and blue). Each layer may represent the application of multiple kernels of a similar size, but one of ordinary skill in the art will understand that each kernel could have different extent over the channel space (i.e., take into account different channels or different numbers of channels). One of ordinary skill in the art will also appreciate that similar convolutional networks may be used to account for more than two images and that a disparity value for a first image in some embodiments is calculated based on a combination of other captured images.

TABLE 2

| Name | Input Resolution | Channels In/Out | Kernel | Stride | Output Resolution |
|---|---|---|---|---|---|
| crop |  | 2/6 |  |  | 576 × 960 |
| conv0 | 576 × 960 | 6/16 | 3 × 3 | 1 | 576 × 960 |
| conv1 | 576 × 960 | 16/32 | 7 × 7 | 2 | 288 × 480 |
| conv2 | 288 × 480 | 32/64 | 5 × 5 | 2 | 144 × 240 |
| conv3 | 144 × 240 | 64/128 | 5 × 5 | 2 | 72 × 120 |
| Conv3_1 | 72 × 120 | 128/128 | 3 × 3 | 1 | 72 × 120 |
| conv4 | 72 × 120 | 128/256 | 3 × 3 | 2 | 36 × 60 |
| Conv4_1 | 36 × 60 | 256/256 | 3 × 3 | 1 | 36 × 60 |
| conv5 | 36 × 60 | 256/256 | 3 × 3 | 2 | 18 × 30 |
| Conv5_1 | 18 × 30 | 256/256 | 3 × 3 | 1 | 18 × 30 |
| convolution2 | 18 × 30 | 256/256 | 3 × 3 | 1 | 18 × 30 |
| convolution3 | 18 × 30 | 256/1 | 3 × 3 | 1 | 18 × 30 |
| deconv4 | 18 × 30 | 256/128 | 4 × 4 | 2 | 36 × 60 |
| upsample_flow_5to4 | 18 × 30 | 1/1 | 4 × 4 | 1 | 36 × 60 |
| concat4 | 36 × 60 | 385/385 |  |  | 36 × 60 |
| Convolution4 | 36 × 60 | 385/128 | 3 × 3 | 1 | 36 × 60 |
| Convolution5 | 36 × 60 | 128/1 | 3 × 3 | 1 | 36 × 60 |
| deconv3 | 36 × 60 | 128/64 | 4 × 4 | 2 | 72 × 120 |
| upsample_flow_4to3 | 36 × 60 | 1/1 | 4 × 4 | 1 | 72 × 120 |
| concat5 | 72 × 120 | 193/72 |  |  | 72 × 120 |
| Convolution6 | 72 × 120 | 193/72 | 3 × 3 | 1 | 72 × 120 |
| Convolution7 | 72 × 120 | 64/1 | 3 × 3 | 1 | 72 × 120 |
| deconv2 | 72 × 120 | 64/32 | 4 × 4 | 2 | 144 × 240 |
| upsample_flow_3to2 | 72 × 120 | 1/1 | 4 × 4 | 1 | 144 × 240 |
| concat6 | 144 × 240 | 97/97 |  |  | 144 × 240 |
| Convolution8 | 144 × 240 | 97/32 | 3 × 3 | 1 | 144 × 240 |
| Convolution9 | 144 × 240 | 32/1 | 3 × 3 | 1 | 144 × 240 |
| deconv1 | 144 × 240 | 32/16 | 4 × 4 | 2 | 288 × 480 |
| upsample_flow_2to1 | 144 × 240 | 1/1 | 4 × 4 | 1 | 288 × 480 |
| concat7 | 288 × 480 | 49/49 |  |  | 288 × 480 |
| Convolution10 | 288 × 480 | 49/16 | 3 × 3 | 1 | 288 × 480 |
| Convolution11 | 288 × 480 | 16/1 | 3 × 3 | 1 | 288 × 480 |
| deconv0 | 288 × 480 | 16/16 | 4 × 4 | 1 | 576 × 960 |
| upsample_flow_1to0 | 288 × 480 | 1/1 | 4 × 4 | 1 | 576 × 960 |
| concat8 | 576 × 960 | 33/33 |  |  | 576 × 960 |
| Convolution10 | 576 × 960 | 33/16 | 3 × 3 | 1 | 576 × 960 |
| Convolution11 | 576 × 960 | 16/1 | 3 × 3 | 1 | 576 × 960 |

Figure 7A:
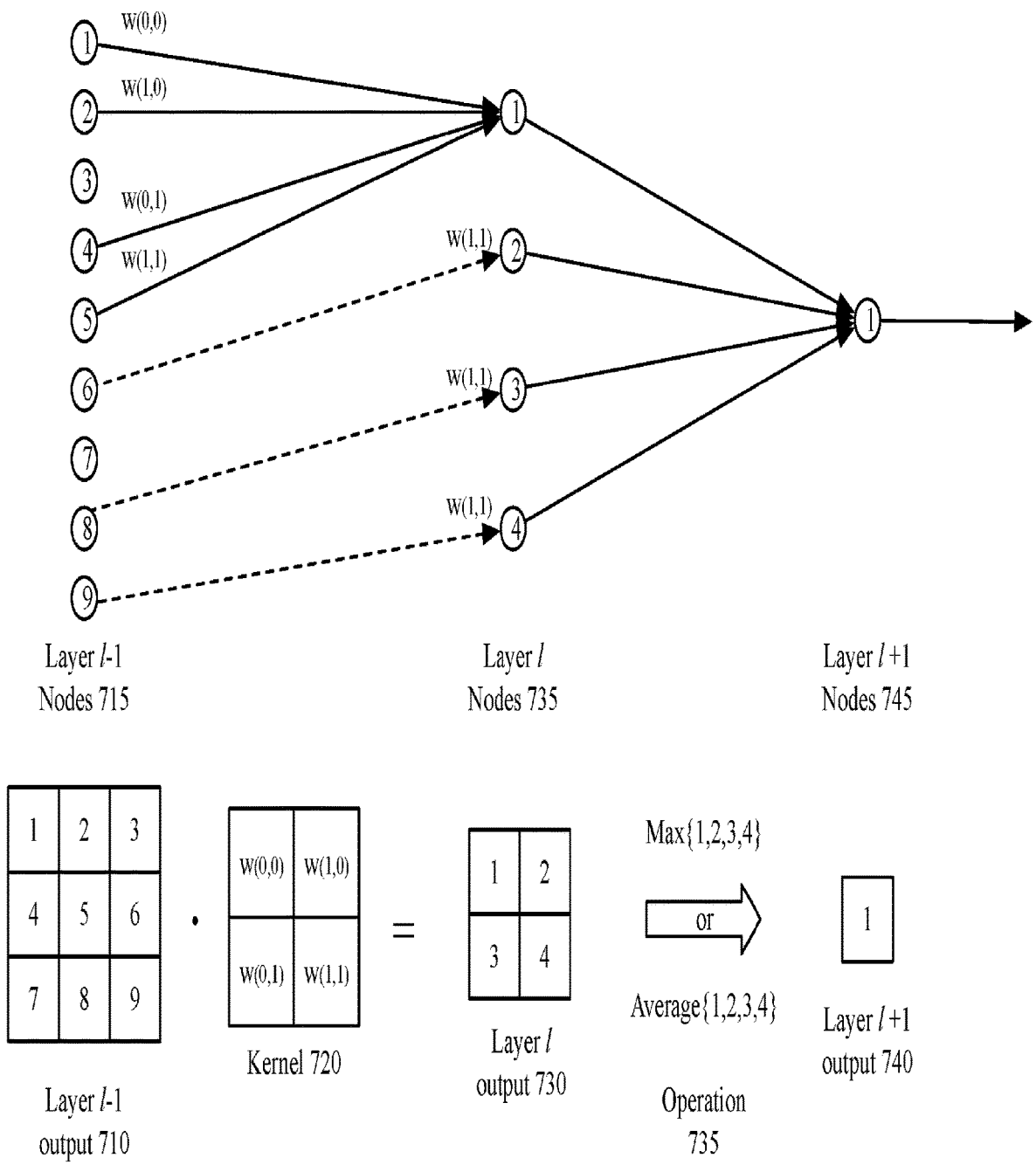
Figures 7B, 7C:
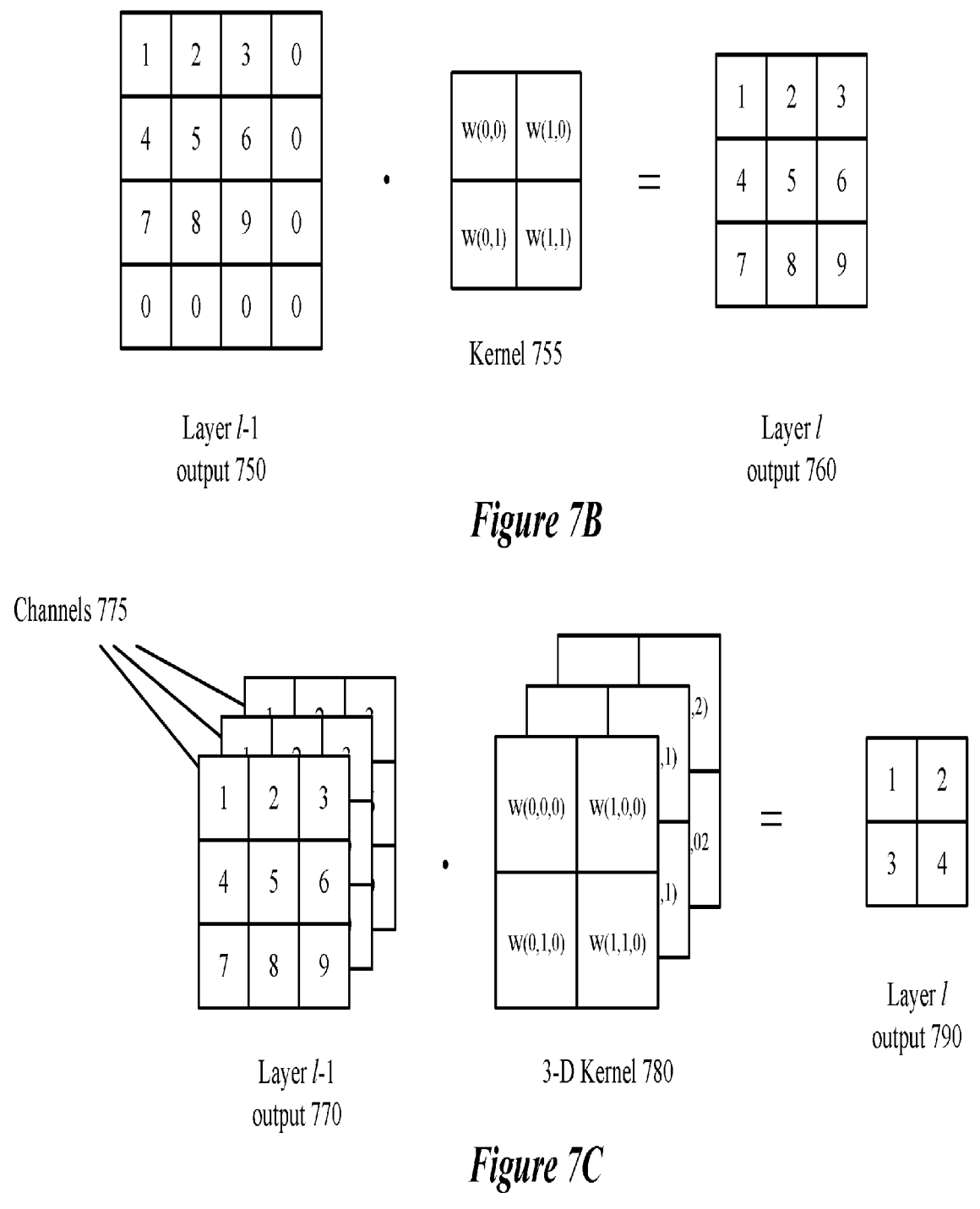

FIGS. 7A-C illustrate a number of different ways to apply a kernel to a set of input nodes. FIG. 7A illustrates an exemplary set of nine input nodes 715 of layer l−1 to which kernel 720 is applied. As shown, kernel 720 includes a set of trainable weights W(0,0), W(1,0), W(0,1), and W(1,1) that are applied to the output of four nodes of layer l−1 (e.g., nodes 1, 2, 4, and 5) to calculate the output of a single node in layer l (e.g., node 1). In some embodiments, an additional pooling operation 735 is applied to generate layer l+1. Operation 735 takes the output of layer l and either takes the maximum of the output of the 4 nodes in the previous layer or an average of the output of the 4 nodes in the previous layer as the basis of the output of the node in layer l+1. One of ordinary skill in the art will understand that the convolution and pooling may be performed within a single layer and that, when performed as separate layers, activation functions will be applied, in some embodiments, before outputting the result to a subsequent layer.

FIG. 7B illustrates a convolution layer with stride 1 and kernel 755 with a size of 2×2. Additionally, FIG. 7B illustrates a situation in which the original data (i.e., output of layer l−1 750) is 'padded' with a set of input/nodes with a default value, in this case 0, so that the output is of the same dimensions as the input. FIG. 7C illustrates a convolution layer that takes into account multiple channels 755 of layer l−1 outputs 770. Three-dimensional kernel 780, has 4 independent weights in three different layers that will be applied to each of three channels to produce a 2×2 output. As in the example above, the first node will be a combination of the weights of nodes 1, 2, 4, and 5 in each of the three channels with weights W(0,0,0), W(1,0,0), W(0,1,0), and W(1,1,0) for the first channel, weights W(0,0,1), W(1,0,1), W(0,1,1), and W(1,1,1) for the second channel, and weights W(0,0,2), W(1,0,2), W(0,1,2), and W(1,1,2) and the third channel. One of ordinary skill in the art will appreciate that an activation function will be applied before data is output to the next layer.

Before a multi-layer network can be used to solve a particular problem, the network has to be put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set, and then (2) back propagates a gradient (rate of change) of a loss function (output error) that quantifies the difference between the input set's known output value set and the input set's computed output value set, in order to adjust the network's configurable parameters (e.g., the weight coefficients). In some embodiments weights are trained towards a discrete set of values (e.g., −1, 0, and 1) as discussed in U.S. Provisional Patent Applications 62/492,940 which is incorporated herein by reference.

Figure 8:
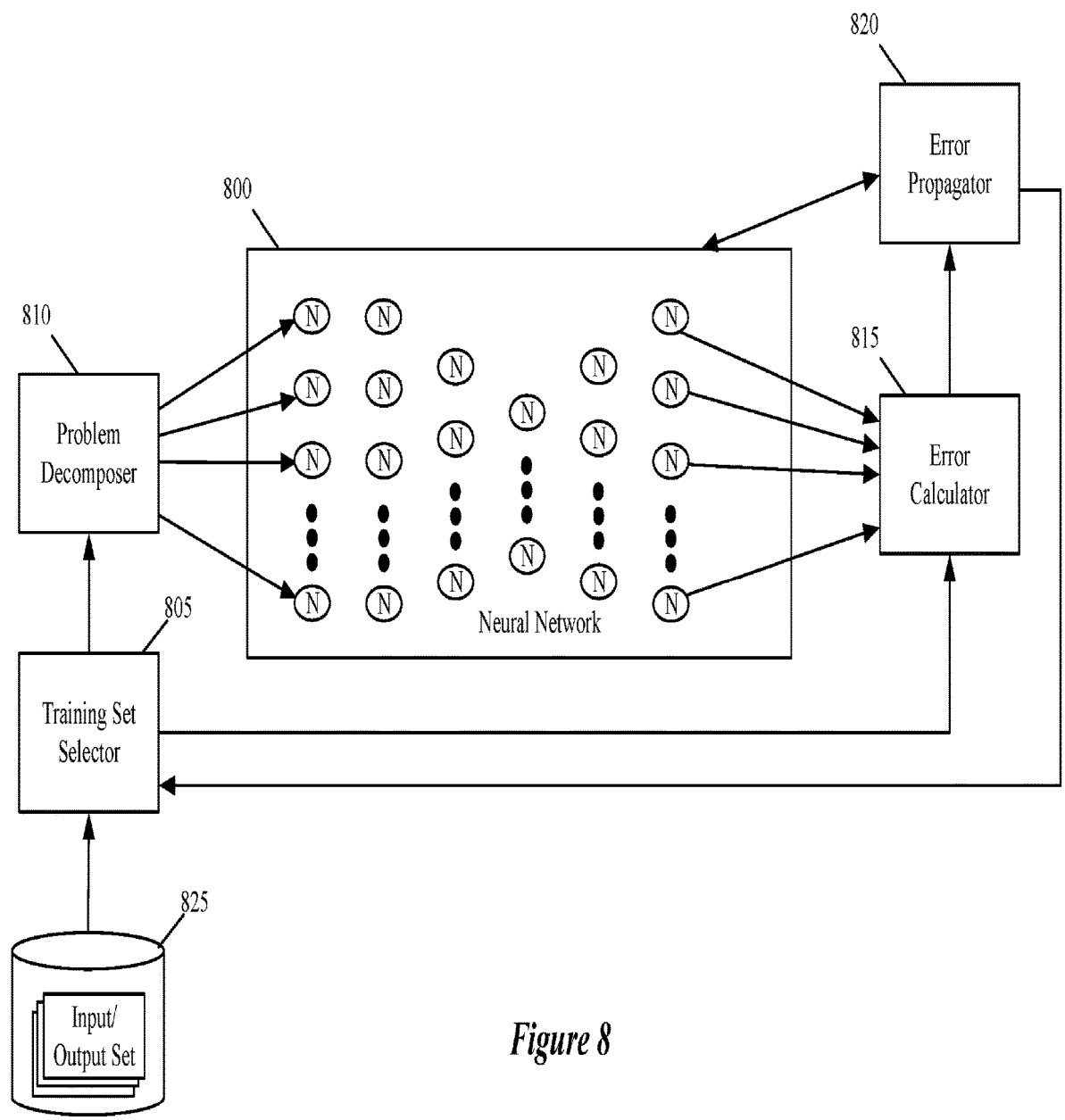
FIG. 8 illustrates a set of modules of some embodiments that perform a back propagation process that uses multiple known training sets to train the MT network.
Figure 9:
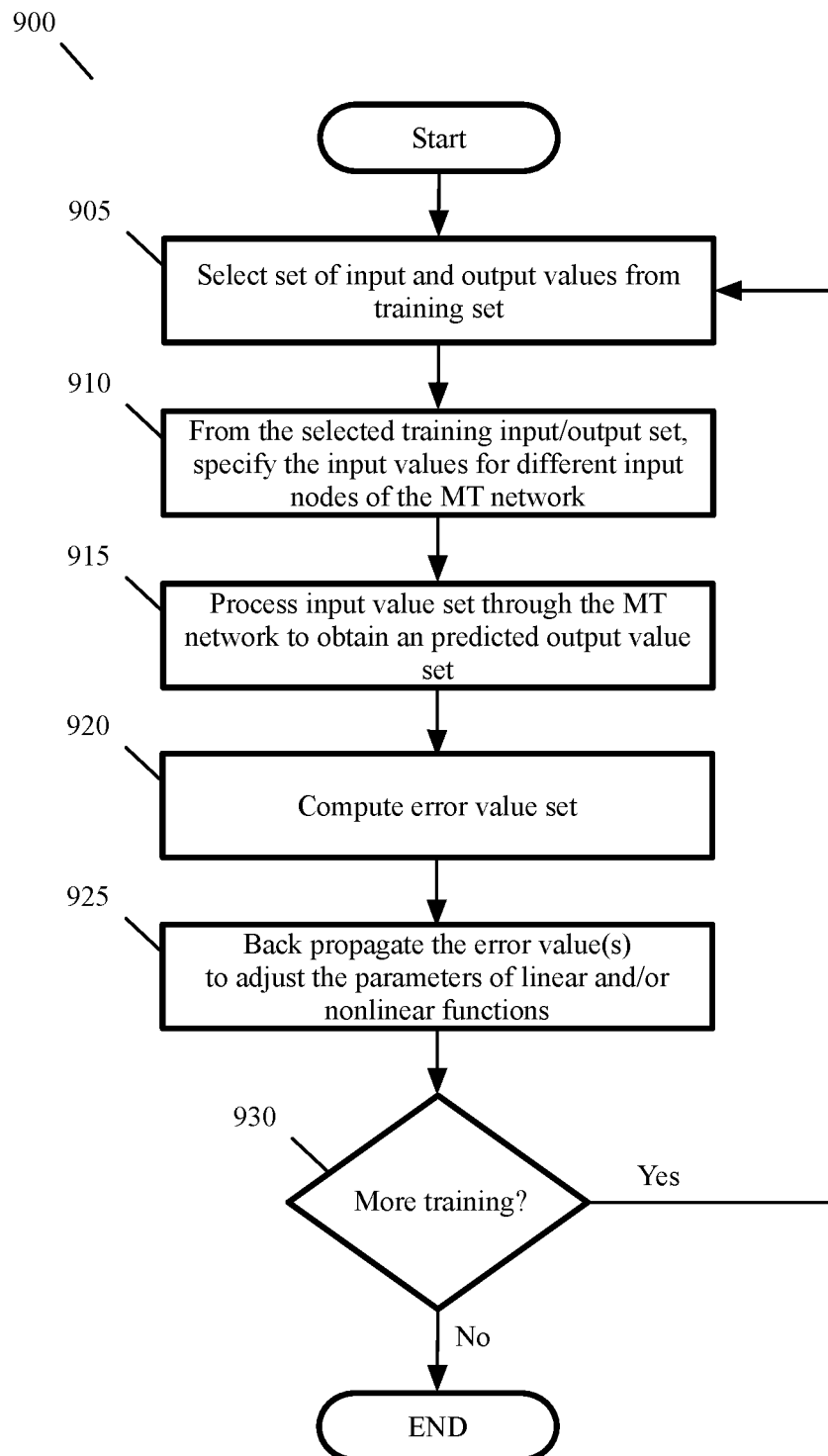
FIG. 9 illustrates the back-propagation process that the modules of FIG. 8 perform.

FIG. 8 illustrates a set of modules of some embodiments that perform a back-propagation process that uses multiple known training sets to train the MT network 800. As shown, these modules include a training set selector 805, an input selector 810, an error calculator 815, and an error propagator 820. In some embodiments, all of these modules execute on one device, such as a mobile device (e.g., smartphone, tablet, etc.) or an IoT device. In other embodiments, these modules are performed on a different device than the device the eventually executes the MT network 800. FIG. 9 illustrates the back-propagation process 900 that the modules of FIG. 8 perform.

As described in FIG. 9, the training set selector 805 initially selects (at 905) a training set from the training sets that are stored in a data storage 825. In some embodiments, the data storage 825 is on the same device that executes the modules 805-820 of FIG. 8, while in other embodiments, this data storage is on a remote server. The selected training set includes a set of input values and a set of output values. The output value set is the set of output values that the MT network should generate for the input value set of the selected training set. In other words, the output value set is the known/desired output value set for the input value set. For example, in some embodiments, the MT network 800 determines a set of disparity values used to calculate the depth of a feature of an input image. For these embodiments, each input/output set in the training set includes (1) a pixel value set of a set of input images as the input value set, and (2) a disparity for a set of pixels in at least one of the input images.

In some embodiments, instead of selecting a training set from a set of pre-generated training sets, process 900 generates a synthetic training set using part of process 300 (i.e., operations 305-320). By generating training sets during training, the process can continue until a satisfactory set of weights (e.g., weights that change less than a certain percent for each iteration) for the nodes (or kernels) of the MT network are found, without reusing the same training sets which can lead to overfitting. Additionally, dynamically generating synthetic training sets allows for generating training sets for which the MT network has produced bad results. For example, if the MT network has produced particularly bad results (e.g., large errors) for training sets that include shadows, objects at certain distances, certain combinations of object distances, objects at certain locations in the image (e.g. center or edge), training sets are dynamically generated with the poorly predicted features to train the MT network to better recognize these features. Thus, there is no fundamental limit to the number of training sets generated and used to train the MT network in such embodiments.

At 910, the input selector 810 selects the inputs to the MT network's input nodes from the set of input values selected at 905. For the above-described disparity problem, the input selector 810 in some embodiments supplies different sets of pixel values from different input image sets as inputs to different input nodes of the MT network 800. Next, at 915, the MT network 800 processes the supplied input values to produce a set of output values. In some embodiments, this processing entails each processing node of the MT network first having its linear operator 510 compute a weighted sum of its input, and then having its nonlinear activation operator 515 compute a function based on the output of the linear component.

At 920, the error calculator 815 computes a set of error values from (1) the output value set produced by the MT network for the supplied input value set, and (2) the output value set from the selected training set (selected at 905). As shown, the error calculator 815 receives the training set's output value(s) from the training set selector 805 in some embodiments. In the example illustrated in FIG. 8, the MT network 800 has multiple output processing nodes that each produce one output value. In other embodiments, the MT network produces a single value from one processing node. For the above-mentioned depth-perception/disparity calculation example, the MT-network produced output value in some embodiments is a value reflecting a shift between objects in terms of number of pixels or a calculated distance to the object. For a selected input/output value set, the desired output value in some embodiments would be the ground truth provided in the input set.

For each output value in the output value set, the error calculator 815 computes (at 920) an error value by subtracting the MT-network produced output value from the desired output value. At 925, the error calculator 815 provides the error value set that it computes to the error propagator 820, which then coordinates the back propagation of this error value set through the processing nodes of the MT network. In some embodiments, each processing node is an instantiated object that includes a back-propagation function for handling back-propagation calls from the error propagator 820. In these embodiments, each time the error propagator 820 calls a processing node's back-propagation function, this function computes adjustments to the parameter(s) of the node's linear operator and/or nonlinear operator and returns to the error propagator 820 error values to propagate back to each of the inputs of the node's linear operator. To call the propagating function of a particular processing node that is not an output processing node, the error propagator 820 in some embodiments aggregates (e.g., sums) the error values that it has receives from all processing nodes when more than one processing node receives the particular processing node's output, and then supplies the aggregated error value to the particular processing node's propagating function.

After the computed error value is back propagated through the processing nodes of the MT network and one or more of these nodes adjust their linear and/or nonlinear operator parameters during this back propagation, the error propagator 820 notifies the training set selector 805 that it has completed its error propagation. Next, at 930, the training set selector 805 determines whether it should stop the training of the MT network. In some embodiments, the training set selector 805 uses a minimization process (e.g., a stochastic gradient descent minimizer) to determine when it should stop the training of the MT network. When the training set selector 805 determines that it should continue the training, the process 900 returns to 905 to select another training set from the storage 825, and then repeats operations 910-930 for this selected training set. As described above, in some embodiments, a new training set is generated instead of selected from a pre-generated set of training sets. In some embodiments, the process 900 can iterate multiple times through one training set (i.e., one input/output set), while this process is training the configurable parameters of the MT network 800. The process 900 ends when the training set selector 805 determines that it does not need to continue the training. In some embodiments, training is performed for a specific sensor array configuration (e.g., training a MT network for use in a specific model of mobile device). However, the same MT network is used in some embodiments for similar sensor array configurations (e.g., an updated version of the mobile device that uses a different distance between sensors) without modification or retraining.

After training the multi-layer network, the network is loaded in a device, in some embodiments, to provide one of, for example, (i) disparity, (ii) depth, or (iii) misalignment values for images captured by the device. The values provided by the trained multi-layer network are then used, in some embodiments, to perform image processing or interpretation. For example, depth values (or depth calculated from a set of disparity values) is used in some devices to create a bokeh effect that mimics the effect of a wide-aperture lens and keeps a subject of an image in focus while blurring the non-subject pixels (i.e., those pixels at a different depth then the subject).

Figure 10:
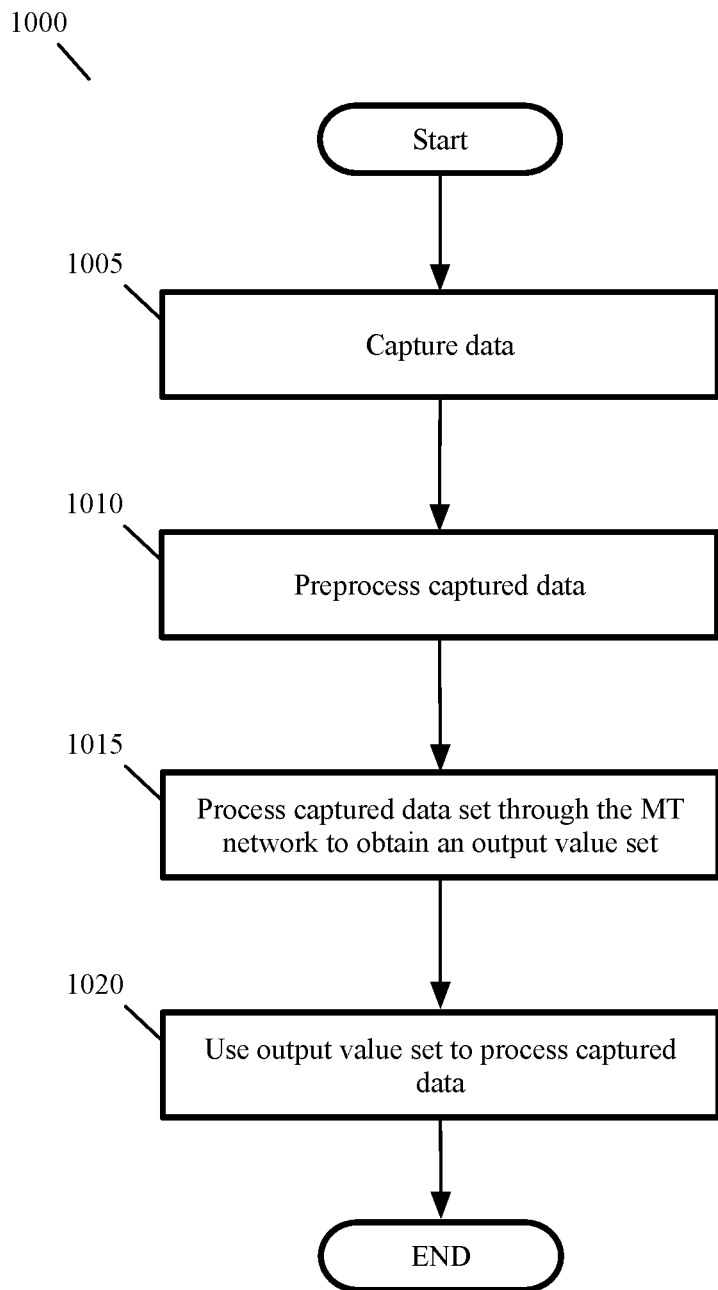
FIG. 10 conceptually illustrates a process for using the MT network in a device to produce output for captured data.

FIG. 10 conceptually illustrates a process 1000 for using the MT network in a device to produce output for captured data. Process 1000 begins by capturing (at 1005) data from the sensor array. In some embodiments, the captured data is a number of images from an array of cameras or audio data captured from a number of microphones. In some embodiments, data is captured simultaneously from the multiple sensors. A sensor array may have sensors oriented in a same direction (e.g., a camera array on the back face of a mobile device) or may have sensors oriented in multiple directions (e.g., a camera array for capturing a full 360° view of a scene). In some embodiments using sensors (e.g., cameras) oriented in multiple directions, certain captured data will reflect a same portion of a scene (e.g., overlapping areas of an image).

The process then preprocesses (at 1010) the captured data to conform to the format accepted by the machine trained network. In some embodiments, the preprocessing includes a cropping operation in which a portion (e.g., borders) of the captured images are removed to change an image resolution to conform to the resolution accepted by the machine-trained network.

After the captured data is in the proper format to be processed by the machine-trained network, the process processes (at 1015) the captured data set through the machine-trained network to produce an output value set. The output value set, in different embodiments, is one of (1) a set of disparity values, (2) a set of depth values, and (3) a set of misalignment values indicating the magnitude of the current misalignment of sensors in the sensor array. A set of disparity values, in some embodiments, is used to calculate a depth value for each pixel in a captured image or an image based on a set of captured image data (e.g., a generated image that approximates an image from a central location in a camera array). In some embodiments, additional values are calculated indicating a flat surface (e.g., the boundaries of the surface) and some embodiments additionally provide a value indicating the orientation of the surface (e.g., a normal vector of the surface).

In some embodiments, the set of disparity values are one-dimensional disparity values, while in other embodiments the set of disparity values are two-dimensional disparity vectors associated with each pixel. In some embodiments, a disparity value (e.g., the number of pixels that an object has shifted between images) is calculated for each pair of images captured by the sensor array. Disparity values, in some embodiments, are calculated for a particular captured image for each of the other captured images or based on some combination of the other captured images (e.g., a composite image created by averaging, or generated as part of the MT network processing). Depth is calculated from the disparity vectors using camera alignment data (e.g., displacement between cameras) and camera focal length. Camera focal length, in some embodiments, is estimated by capturing a 360° panorama and using a levenberg-marquardt (LM) solver to find the focal length of each camera such that images fit together around a sphere. In some embodiments using the LM solver, data from an orientation sensor is used to seed an initial solution for the LM solver.

The LM solver, in some embodiments, simultaneously solves for additional parameters such as barrel distortion and misalignment of the camera lenses with respect to the sensor arrays (e.g., when the optical axis of the lens does not exactly intersect with the center of the sensor). In some embodiments, the LM solver is run (1) periodically (e.g., after a certain number of images, or a certain amount of time), (2) under certain conditions (e.g., based on sensing a sudden jolt such as from a fall, or based on a change in ambient conditions such as temperature or humidity), or (3) a combination of periodically and condition-based. In some embodiments, the LM solver is run while a device is idle to maintain up-to-date values for focal length, barrel distortion, or misalignment of the camera lenses with the sensor array. In such embodiments, high quality results are produced in the face of a wide spectrum of manufacturing tolerance and quality issues, and this quality is maintained over time as the system changes due to shock or environmental conditions A set of misalignment values for a set of cameras, in some embodiments, takes the form of translation vectors indicating the offsets between the centers of projection of the cameras relative to some useful coordinate system, and quaternions indicating the orientations of the cameras' optical axes and reference vectors associated with the cameras. The useful coordinate system, in some embodiments, is the center of the camera array mechanical assembly, but one of ordinary skill in the art will appreciate that it may be some other useful point. The misalignment values in such embodiments would thus be a 3-vector and a 4-vector for a total of 7 floating point numbers per camera.

After the captured data is processed by the machine trained network, the process uses (at 1020) the output value set to process the captured data. In some embodiments, using the output value set comprises appending disparity or depth output values to the captured data files. The output value set, in some embodiments, is stored separately and used to facilitate image processing such as introducing bokeh to a captured image by rendering objects at a greater distance than a foreground object out of focus. Processing, in some embodiments, uses output value ranges to determine which pixels to modify and the degree to which they should be modified (e.g., pixels at depths between within 1 meter of a person's face in the image are not modified, objects greater than 1 meter away from the person's face have a modification (e.g., convolution of nearby pixels) applied that is a function of the output value for depth (e.g., more pixels associated for an object at a greater depth)). In embodiments calculating misalignment values, the output value set is used to apply corrections to the original captured data.

In some embodiments in which the output of the MT network is a set of misalignment vectors for a camera array, no factory calibration of the camera array is performed. Misalignment values, in some embodiments, are calculated (1) periodically (e.g., after a certain number of images, or a certain amount of time), (2) under certain conditions (e.g., based on sensing a sudden jolt such as from a fall, or based on a change in ambient conditions such as temperature or humidity), or (3) a combination of periodically and condition-based. In some embodiments, misalignment values are calculated using the MT network while a device is idle to maintain up-to-date values for current camera misalignment. A set of calculated misalignment values, in some embodiments, is used to correct subsequently captured images until a new set of misalignment values is calculated.

In some embodiments, the output value set is used to determine whether other actions should be taken based on object proximity. For example, a rear view camera array may warn a driver when the car is too close to another object, or, in some embodiments, a series of captured data sets are processed to determine if objects are moving closer, and at what rate, to provide collision avoidance based on a car-mounted sensor array. Collision avoidance, in some embodiments includes at least one of, (1) providing a warning, (2) automatic braking, and (3) automatic steering. One of ordinary skill in the art will appreciate that, in some embodiments, certain operations will not be performed in the order presented or at all. For example, preprocessing may not be necessary in some embodiments in which the machine-trained network is designed for a specific sensor array, or processing captured data may be performed as part of a user-defined operation.

Figure 11:
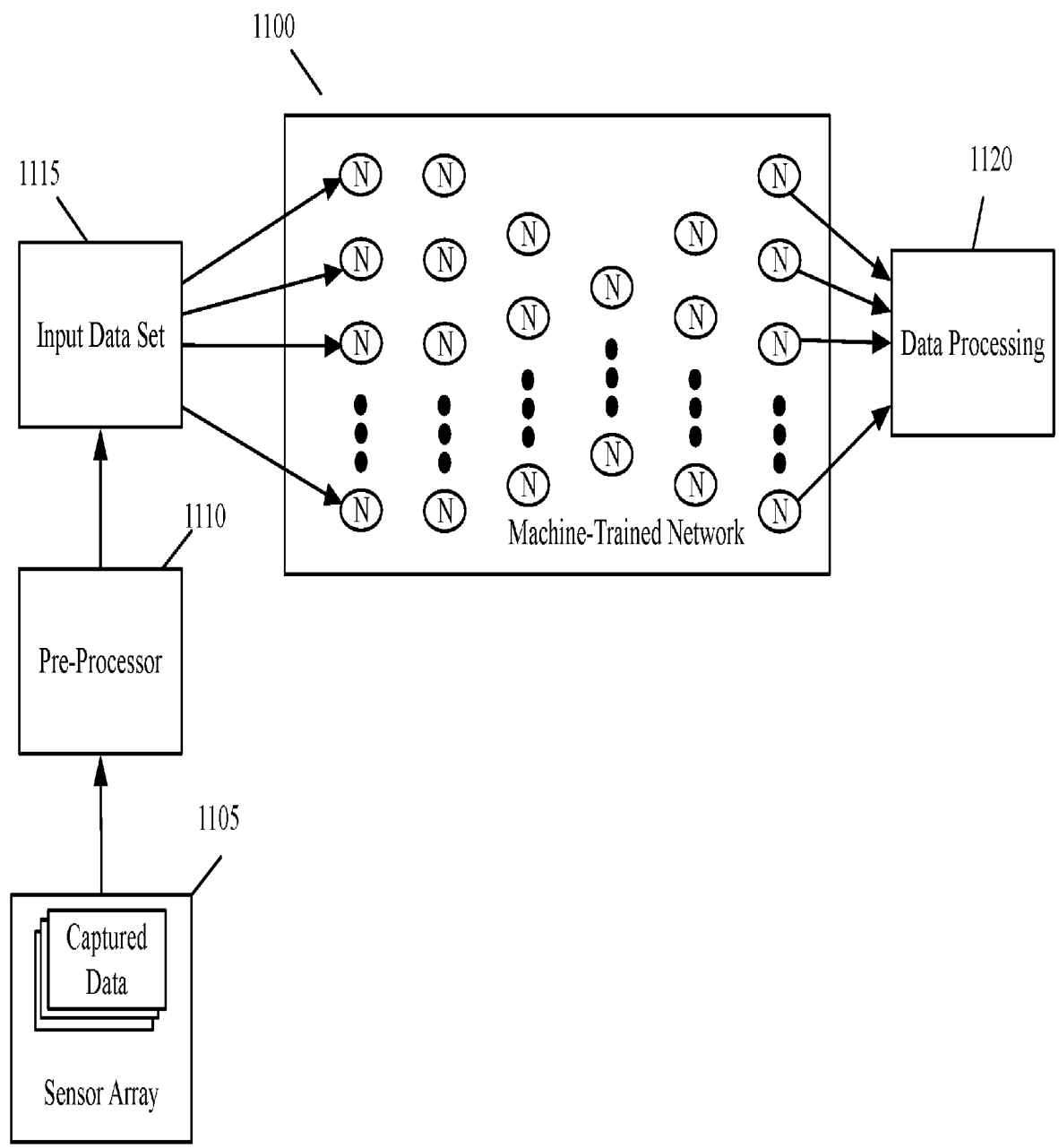
FIG. 11 illustrates a system using a machine-trained network to compute an output value set from data captured by a sensor array.

FIG. 11 illustrates a system using a machine-trained network to compute an output value set from data captured by a sensor array. FIG. 11 includes MT network 1100, a sensor array 1105, a pre-processor 1110, an input data set 1115 and a data processing unit 1120. As described in relation to FIG. 10, sensor array 1105 captures data that is passed to pre-processor 1110. Pre-processor 1110 takes the raw data set and converts it into a form that is acceptable to MT network 1100 (e.g., by cropping raw image data to be of a certain size). Once input data set 1115 is in the proper format, it is fed to MT network 1100 as input data and MT network 1100 processes the input data set to produce the output value set. The output value set is then passed to data processing module 1120. As described above, data processing module in some embodiments uses the output value set to perform image processing (e.g., bokeh, correcting for skew, etc.) or to warn a driver of objects that are potentially dangerous (e.g., if multiple groups of images indicate that an object is approaching a vehicle at a rate above a certain threshold or is within a certain threshold distance of the car).

Figure 12:
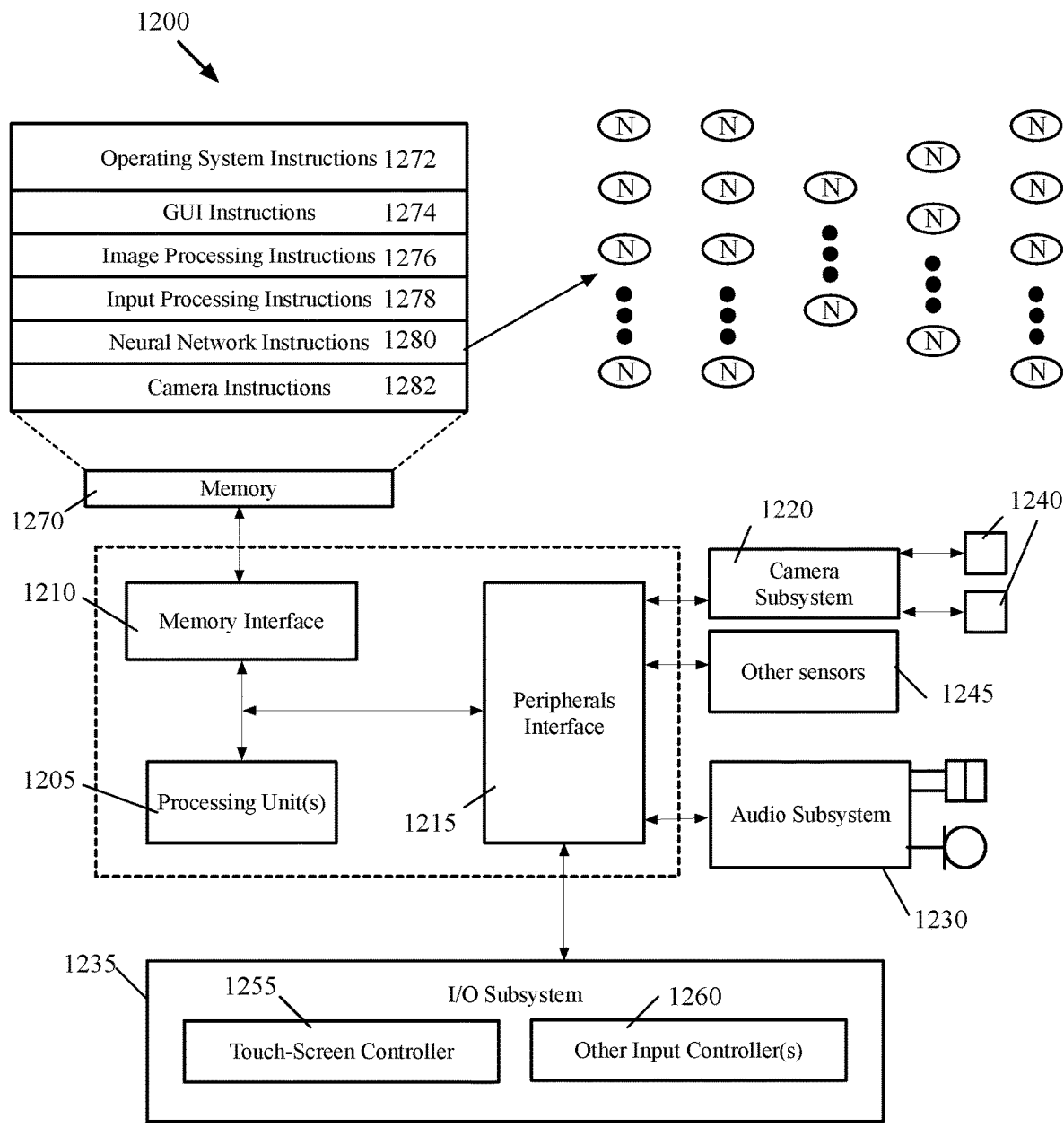
FIG. 12 illustrates an example of an architecture of a mobile computing device that stores neural network processing instructions, and multiple sub-networks that can be loaded into the processor for different purposes.

FIG. 12 is an example of an architecture 1200 of a mobile computing device that stores neural network processing instructions, and multiple sub-networks that can be loaded into the processor for different purposes. Examples of mobile computing devices include smartphones, tablets, laptops, etc. As shown, the mobile computing device 1200 includes one or more processing units 1205, a memory interface 1210 and a peripherals interface 1215.

The peripherals interface 1215 is coupled to various sensors and subsystems, including a camera subsystem 1220, an audio subsystem 1230, an I/O subsystem 1235, and other sensors 1245 (e.g., motion sensors), etc. The peripherals interface 1215 enables communication between the processing units 1205 and various peripherals. For example, an orientation sensor (e.g., a gyroscope) and an acceleration sensor (e.g., an accelerometer) can be coupled to the peripherals interface 1215 to facilitate orientation and acceleration functions. The camera subsystem 1220 is coupled to one or more optical sensors 1240 (e.g., a charged coupled device (CCD) optical sensor, a complementary metal-oxide-semiconductor (CMOS) optical sensor, etc.). The camera subsystem 1220 and the optical sensors 1240 facilitate camera functions, such as image and/or video data capturing.

The audio subsystem 1230 couples with a speaker to output audio (e.g., to output voice navigation instructions). Additionally, the audio subsystem 1230 is coupled to a microphone to facilitate voice-enabled functions, such as voice recognition (e.g., for searching), digital recording, etc. The I/O subsystem 1235 involves the transfer between input/output peripheral devices, such as a display, a touch screen, etc., and the data bus of the processing units 1205 through the peripherals interface 1215. The I/O subsystem 1235 includes a touch-screen controller 1255 and other input controllers 1260 to facilitate the transfer between input/output peripheral devices and the data bus of the processing units 1205. The touch-screen controller couples with a touch screen (not shown) to detect contact and movement on the touch screen using any of multiple touch sensitivity technologies. The other input controllers 1260 are coupled to other input/control devices, such as one or more buttons.

In some embodiments, the device includes wireless communication subsystem (not shown in FIG. 12) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 1210 is coupled to memory 1270. In some embodiments, the memory 1270 includes volatile memory (e.g., high-speed random access memory), non-volatile memory (e.g., flash memory), a combination of volatile and non-volatile memory, and/or any other type of memory. As illustrated in FIG. 12, the memory 1270 stores an operating system (OS) 1272. The OS 1272 includes instructions for handling basic system services and for performing hardware dependent tasks.

The memory 1270 also stores various sets of instructions, including (1) graphical user interface instructions 1274 to facilitate graphic user interface processing; (2) image processing instructions 1276 to facilitate image-related processing and functions; (3) input processing instructions 1278 to facilitate input-related (e.g., touch input) processes and functions; and (4) camera instructions 1282 to facilitate camera-related processes and functions. The processing units 1210 execute the instructions stored in the memory 1270 in some embodiments.

In addition, the memory 1270 stores neural network instructions 1280, for implementing the machine-trained network of some embodiments of the invention. The memory also stores a set of weight values for an audio-processing network and a set of weight values for an image-processing network in some embodiments.

The memory 1270 further stores communication instructions to facilitate communicating with one or more additional devices. The instructions described above are merely exemplary and the memory 1270 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits. The memory 1270 may represent multiple different storages available on the device 1200.

While the components illustrated in FIG. 12 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 12 may be split into two or more integrated circuits.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
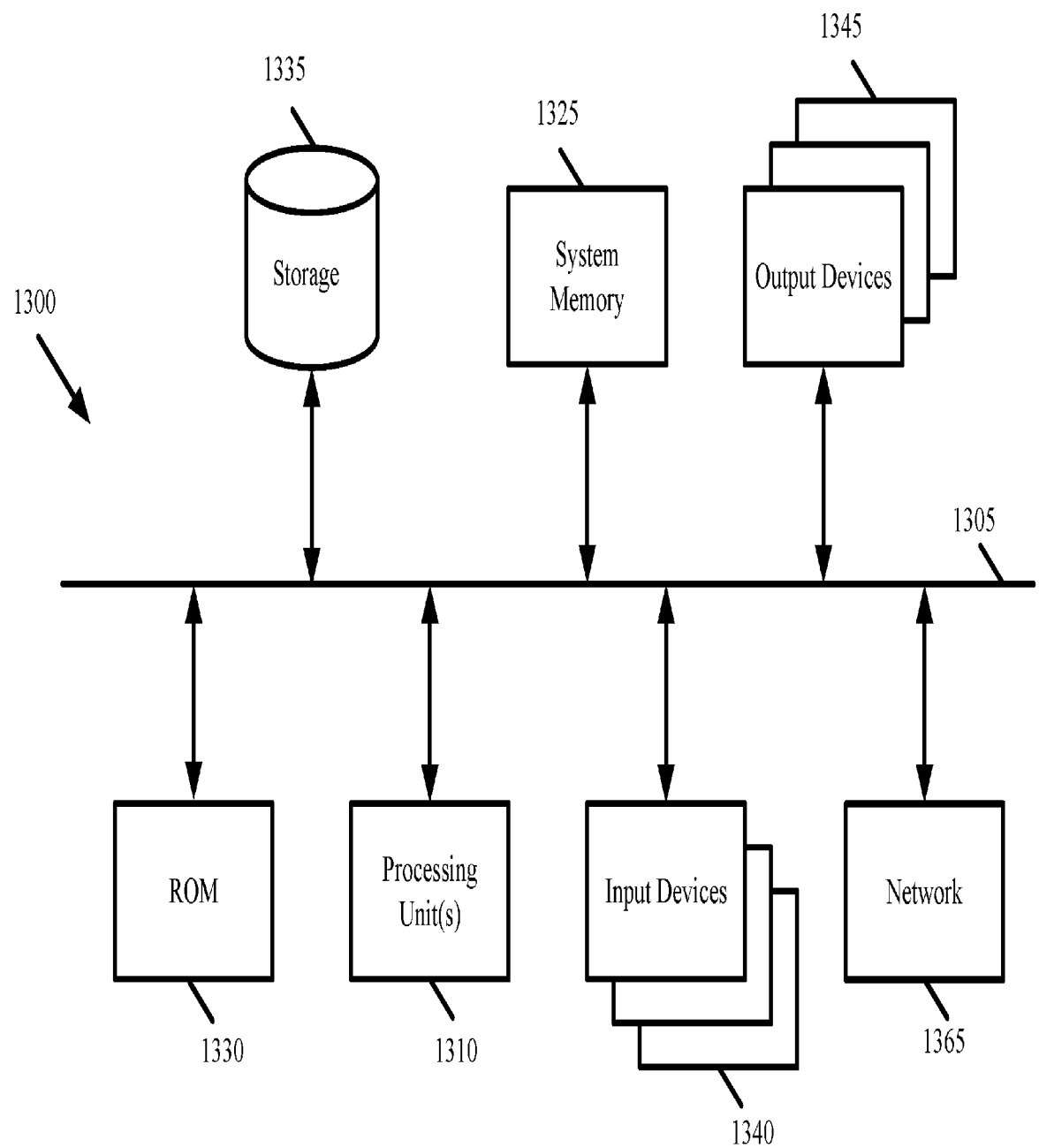
FIG. 13 conceptually illustrates an electronic system with which some embodiments of the invention are implemented.

FIG. 13 conceptually illustrates an electronic system 1300 with which some embodiments of the invention are implemented. The electronic system 1300 can be used to execute any of the control, virtualization, or operating system applications described above. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 4, 9 and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for configuring a plurality of parameters of a machine-trained (MT) network to account for deviations in locations and orientations of a plurality of image capture devices, each image capture device having a desired location and orientation relative to the other image capture devices, the method comprising:
   propagating a set of inputs through the MT network to generate a set of outputs, wherein each input (i) has a corresponding expected output and (ii) comprises a plurality of images of a scene each of which represents an image captured by one of the plurality of image capture devices from a particular location and orientation, wherein for at least a subset of the inputs the particular location and orientation of the corresponding image capture device for at least one of the images of the input deviates from a desired location and orientation of the corresponding image capture device; and
   based on differences between the expected outputs and the generated outputs, training the parameters of the MT network to account for the deviations in the locations and orientations of image capture devices,
   wherein after the MT network has been trained, the MT network is used to adjust each of a plurality of sets of images, each set of images comprising two or more images with the images in each set being concurrently captured by a set of image capture devices having desired locations and orientations relative to each other that are the same as the plurality of image capture devices, the captured images analyzed after adjustment to extract data from the captured images.

2. The method of claim 1, wherein training the parameters of the MT network comprises:
   computing a value for a loss function based on the differences between the expected outputs and the generated outputs; and
   back propagating a gradient of the loss function through the MT network.

3. The method of claim 1, wherein the plurality of images for each particular input represent simultaneously captured images.

4. The method of claim 1, wherein:
   the generated set of outputs for each respective input comprises a disparity value for each pixel of a plurality of pixels in at least one of the images of the plurality of images of the respective input; and
   the disparity value for each pixel of the plurality of pixels of a particular image is a measure of how far the pixel shifts between the particular image and a second image of the plurality of images.

5. The method of claim 4, wherein the disparity values are used to calculate depth values for the plurality of pixels.

6. The method of claim 1, wherein:
   the generated set of outputs for each respective input comprises a depth value for each pixel of a plurality of pixels in at least one of the images of the plurality of images of the respective input; and
   the depth value for each pixel of the plurality of pixels of a particular image indicates a distance from a point associated with the plurality of image capture devices to an object associated with the pixel.

7. The method of claim 1, wherein the MT network is a neural network with a plurality of convolutional layers.

8. The method of claim 1, wherein the plurality of images for a particular input comprises a plurality of simulated images generated for training the MT network.

9. The method of claim 1, wherein the plurality of image capture devices comprises a set of image capture devices of a mobile device.

10. The method of claim 1, wherein the plurality of image capture devices comprises a set of image capture devices of a vehicle.

11. A non-transitory machine readable medium storing a program, which when executed by at least one hardware processing unit, configures a plurality of parameters of a machine-trained (MT) network to account for deviations in locations and orientations of a plurality of image capture devices, each image capture device having a desired location and orientation relative to the other image capture devices, the program comprising sets of instructions for:
   propagating a set of inputs through the MT network to generate a set of outputs, wherein each input (i) has a corresponding expected output and (ii) comprises a plurality of images of a scene each of which represents an image captured by one of the plurality of image capture devices from a particular location and orientation, wherein for at least a subset of the inputs the particular location and orientation of the corresponding image capture device for at least one of the images of the input deviates from a desired location and orientation of the corresponding image capture device; and
   based on differences between the expected outputs and the generated outputs, training the parameters of the MT network to account for the deviations in the locations and orientations of image capture devices, wherein the MT network is used after the MT network has been trained to adjust each of a plurality of sets of images, each set of images comprising two or more images with the images in each set being concurrently captured by a set of image capture devices having desired locations and orientations relative to each other that are the same as the plurality of image capture devices, the captured images analyzed after adjustment to extract data from the captured images.

12. The non-transitory machine readable medium of claim 11, wherein the set of instructions for training the parameters of the MT network comprises sets of instructions for:
computing a value for a loss function based on the differences between the expected outputs and the generated outputs; and
back propagating a gradient of the loss function through the MT network.

13. The non-transitory machine readable medium of claim 11, wherein the plurality of images for each particular input represent simultaneously captured images.

14. The non-transitory machine readable medium of claim 11, wherein:
the generated set of outputs for each respective input comprises a disparity value for each pixel of a plurality of pixels in at least one of the images of the plurality of images of the respective input; and
the disparity value for each pixel of the plurality of pixels of a particular image is a measure of how far the pixel shifts between the particular image and a second image of the plurality of images.

15. The non-transitory machine readable medium of claim 14, wherein the disparity values are used to calculate depth values for the plurality of pixels.

16. The non-transitory machine readable medium of claim 11, wherein:
the generated set of outputs for each respective input comprises a depth value for each pixel of a plurality of pixels in at least one of the images of the plurality of images of the respective input; and
the depth value for each pixel of the plurality of pixels of a particular image indicates a distance from a point associated with the plurality of image capture devices to an object associated with the pixel.

17. The non-transitory machine readable medium of claim 11, wherein the MT network is a neural network with a plurality of convolutional layers.

18. The non-transitory machine readable medium of claim 11, wherein the plurality of images for a particular input comprises a plurality of simulated images generated for training the MT network.

19. The non-transitory machine readable medium of claim 11, wherein the plurality of image capture devices comprises a set of image capture devices of a mobile device.

20. The non-transitory machine readable medium of claim 11, wherein the plurality of image capture devices comprises a set of image capture devices of a vehicle.

* * * * *